(12) United States Patent
Ishihara

(10) Patent No.: US 7,360,291 B2
(45) Date of Patent: Apr. 22, 2008

(54) METHOD OF MANUFACTURING A RECORDING TAPE CARTRIDGE

(75) Inventor: Yusuke Ishihara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 509 days.

(21) Appl. No.: 11/037,136

(22) Filed: Jan. 19, 2005

(65) Prior Publication Data

US 2005/0127225 A1 Jun. 16, 2005

Related U.S. Application Data

(62) Division of application No. 10/668,313, filed on Sep. 24, 2003, now Pat. No. 6,955,317.

(30) Foreign Application Priority Data

Sep. 24, 2002 (JP) ............................. 2002-276804

(51) Int. Cl.
*B23P 11/00* (2006.01)
*G11B 23/04* (2006.01)

(52) U.S. Cl. .................. 29/434; 29/603.01; 29/806; 242/338.1; 242/348; 242/132

(58) Field of Classification Search ............. 29/603.01, 29/434, 806; 242/338.1, 348, 132
See application file for complete search history.

(56) References Cited

U.S. PATENT DOCUMENTS

| | | | | |
|---|---|---|---|---|
| 5,366,173 A | * | 11/1994 | Lammers et al. | 242/338.1 |
| 5,813,622 A | * | 9/1998 | von Alten | 242/348 |
| 5,826,811 A | * | 10/1998 | Melbye et al. | 242/345.2 |
| 5,893,527 A | * | 4/1999 | Mizutani et al. | 242/348 |
| 5,901,916 A | * | 5/1999 | McAllister et al. | 242/348 |
| 6,113,020 A | * | 9/2000 | Nayak | 242/348 |
| 6,452,747 B1 | * | 9/2002 | Johnson et al. | 360/132 |
| 6,700,742 B2 | * | 3/2004 | Tsuyuki et al. | 360/134 |
| 6,745,968 B1 | * | 6/2004 | Schoettle et al. | 242/338.1 |
| 2004/0195418 A1 | * | 10/2004 | Satoh | 242/348.2 |

FOREIGN PATENT DOCUMENTS

| | | |
|---|---|---|
| JP | 63-251983 A | 10/1988 |
| JP | 4-332980 A | 11/1992 |
| JP | 11-238352 A | 8/1999 |
| JP | 2000-48525 A | 2/2000 |
| JP | 3187022 B2 | 5/2001 |

OTHER PUBLICATIONS

US 6,736,334, 05/2004, Tsuyuki et al. (withdrawn)*

* cited by examiner

*Primary Examiner*—Jermie E. Cozart
(74) *Attorney, Agent, or Firm*—Sughrue Mion, PLLC

(57) ABSTRACT

A recording tape cartridge including: a reel, and gear teeth are provided at an inner side of a floor portion of a reel hub on which a recording tape is wound; a case which accommodates the reel, and an engaging projection is formed at a surface of the case opposing the floor portion of the reel hub; a braking member having a disc, and a braking gear, which is annular and which can mesh with the gear teeth, is provided at one surface of the disc, and the braking member can move within the case in a direction of thickness of the case; and a groove wall portion standing erect at the disc and demarcating an insertion groove in which the engaging projection enters over an entire stroke of movement of the braking member. The groove wall portion impedes rotation of the braking member, and guides the braking member.

5 Claims, 14 Drawing Sheets

METHOD OF MANUFACTURING A RECORDING TAPE CARTRIDGE

CROSS-REFERENCE TO RELATED APPLICATION

This is a divisional of application Ser. No. 10/668,313 filed Sep. 24, 2003 now U.S. Pat. No. 6,955,317 B2.

This application claims priority under 35 USC 119 from Japanese Patent Application No. 2002-276804, the disclosure of which is incorporated by reference herein.

BACKGROUND OF THE INVENTION

1. Field of the Invention

The present invention relates to a recording tape cartridge which rotatably accommodates a reel on which a recording tape, such as a magnetic tape or the like, is wound.

2. Description of the Related Art

Recording tapes, such as magnetic tapes and the like, are used as external recording media of computers and the like. Little space is required for storage of the recording tape, and a large amount of information can be recorded thereon. A so-called single-reel recording tape cartridge is used which rotatably accommodates, within a case, a single reel on which such a recording tape is wound.

Such a recording tape cartridge has a brake mechanism so that the reel does not rotate within the case when the recording tape cartridge is not being used (see, for example, Japanese Patent No. 3187022). A recording tape cartridge equipped with this brake mechanism will be described hereinafter on the basis of FIGS. 12 and 13.

In a recording tape cartridge 200 shown in FIG. 12, a single reel 204 is accommodated within a case 202. The case 202 has a gear opening 206 which is formed at the central portion of a floor plate 202A of the case 202, and a rotation restricting rib 208 which projects downward from a ceiling plate 202B.

The reel 204 has a reel hub 210 which is formed in the shape of a cylinder having a floor, and on whose outer peripheral portion a recording tape is wound. A reel gear 214, which can mesh with a driving gear 212A formed at a rotating shaft 212 of a drive device, is formed in an annular form at the bottom surface of a floor portion 210A of the reel hub 210. Through holes 216, which pass through the floor portion 210A, are provided at a plurality of places which are evenly spaced on a circumference at the region where the reel gear 214 is formed. The diameter of each through hole 216 is greater than the gear pitch of the reel gear 214. Teeth of the reel gear 214 are not provided around each through hole 216.

Anchor projections 218 stand erect at the top surface of the floor portion 210A of the reel hub 210, discretely at plural positions between the through holes 216 which are disposed along a predetermined circumference. A gear tooth 218A is formed at the top end portion of each anchor projection 218.

A disc-shaped braking member 220 is inserted in the reel hub 210. A braking gear 220A, which is annular and which can mesh with the gear teeth 218A, is provided at the bottom surface of the braking member 220. A projection or groove wall portion 222 stands erect at the top surface of the braking member 220. An insertion groove 222A, in which the rotation restricting rib 208 of the case 202 is inserted, is provided at the projection or groove wall portion 222. Due to the rotation restricting rib 208 being inserted in the insertion groove 222A, the braking member 220 cannot rotate with respect to the case 202. The braking member 220 can move in the vertical directions while being guided by the rotation restricting rib 208.

A compression coil spring 224 is disposed between the ceiling plate 202B of the case 202 and the braking member 220. Usually, the braking member 220 is urged downward by the urging force of the compression coil spring 224, such that the braking gear 220A meshes with the gear teeth 218A. In this way, there is usually a rotation locked state in which rotation of the reel 204 with respect to the case 202 is impeded. Further, the reel gear 214 is exposed from the gear opening 206 while the reel 204 is pushed against the floor plate 202A of the case 202 by this urging force.

Moreover, a releasing member 226 is disposed between the floor portion 210A of the reel hub 210 and the braking member 220, so as to abut both. The releasing member 226 has leg portions 226A which are formed in the shape of plates which do not interfere with the anchor projections 218, and which enter into the respective through holes 216.

Due to the driving gear 212A meshing with the reel gear 214, as shown in FIG. 13, the leg portions 226A are pushed by the driving gear 212A against the urging force of the compression coil spring 224, and the releasing member 226 is pushed upward. When the braking member 220 is pushed upward while the releasing member 226 moves away from the floor portion 210A, the meshing of the braking gear 220A and the gear teeth 218A is released. At this time, the reel 204 also floats up from the floor plate 202A, and the reel 204 becomes able to rotate within the case 202.

When the rotating shaft 212 rotates, because the reel 204 rotates within the case 202, the reel gear 214 meshes with the driving gear 212A of the rotating shaft 212. At this time, the releasing member 226 rotates together with the reel 204, and the axially central portion of the releasing member 226 slidingly contacts the axially central portion of the braking member 220. Thus, the axially central portion of the braking member 220 is a convex portion 220B which is formed in the shape of a substantially spherical surface, and substantially point-contacts the axially central portion of the releasing member 226.

On the other hand, when the meshing of the driving gear 212A and the reel gear 214 is released, due to the urging force of the compression coil spring 224, the braking member 220 moves downward, the braking gear 220A and the gear teeth 218A mesh together, and the reel 204 is pushed against the floor plate 202A. In this way, the reel 204 returns to the rotation locked state in which rotation of the reel 204 with respect to the case 202 is impeded.

Although not illustrated, a structure is known which does not have the releasing member 226. In this structure, the convex portion 220B of the braking member 220 is directly pressed by a releasing portion, which projects at the axially central portion of the rotating shaft 212 and enters in from a through hole which passes through the floor portion 210A of the reel hub 210, such that the braking member 220 is pushed upward and the rotation locked state of the reel 204 is released (see, for example, Japanese Patent Application Laid-Open (JP-A) No. 63-251983). A recording tape cartridge having such a structure does not have the anchor projections 218, which are for providing, at positions which do not interfere with the releasing member 226, the gear teeth 218A which mesh with the braking member 220, and the gear teeth are provided in an annular form at the floor portion of the reel hub. However, this structure is the same as the previously-described recording tape cartridge 200 in that rotation of the braking member is impeded by the rotation restricting rib of the case, and in that the braking member is guided by the rotation restricting rib in directions of approaching and moving away from the gear teeth.

However, in the above-described conventional recording tape cartridge 200, in order to permit smooth movement of the braking member 220, a predetermined clearance is provided between the rotation restricting rib 208 of the case 202 and the insertion groove 222A surrounded by the groove wall portion 222 of the braking member 220. Thus, a problem arises in that it is easy for the braking member 220 to tilt with respect to the case 202 (i.e., the reel 204).

Specifically, as shown in FIG. 14A, a maximum angle of inclination θ3 of the braking member 220 with respect to the case 202 (in a case in which the braking member 220 tilts so as to enter in between two of the anchor projections 218) at the time when rotation of the reel 204 is permitted is substantially 2°. As shown in FIG. 14B, when rotation of the reel 204 is locked (e.g., in a case in which the amount of insertion of the rotation restricting rib 208 into the insertion groove 222A is small), a maximum angle of inclination θ4 of the braking member 220 with respect to the case 202 is substantially 6°.

At the time when the recording tape cartridge 200 is not being used (i.e., at the time when rotation of the reel 204 is locked), the braking member 220 tilting greatly in this way becomes a cause of problems in the meshing of the gear teeth 218A and the braking gear 220A. At the time when the reel 204 is driven to rotate, this causes noise or the like due to the region, where the convex portion 220B of the braking member 220 slidingly contacts the releasing member 226, being offset from the axial center of the releasing member 226.

Further, also in the recording tape cartridge which does not have the releasing member 226 and the anchor projections 218, because the other structures thereof are similar to those of the recording tape cartridge 200, a problem which is similar to the above-described problem of the braking member tilting with respect to the case (reel) arises.

SUMMARY OF THE INVENTION

In view of the aforementioned, an object of the present invention is to provide a recording tape cartridge in which it is possible to suppress tilting, with respect to a case, of a braking member which impedes rotation of a reel at the time when the recording tape cartridge is not being used.

A first aspect of the present invention provides a recording tape cartridge comprising: a reel having a reel hub on which a recording tape is wound, and gear teeth are provided at an inner side of a floor portion of the reel hub; a case which accommodates the reel, and an engaging projection is formed at a surface of the case opposing the floor portion of the reel hub; a braking member having a disc, and a braking gear, which is annular and which can mesh with the gear teeth, is provided at one surface of the disc, and the braking member approaches and moves away from the floor portion of the reel hub within the case so as to be able to be positioned at a meshing position, at which the braking gear meshes with the gear teeth, and a released position at which a meshed state is released; and a groove wall portion standing erect at the disc and forming an insertion groove in which the engaging projection enters over an entire stroke of movement of the braking member, and the groove wall portion impedes rotation of the braking member with respect to the case, and guides the braking member in directions of approaching and moving away from the floor portion of the reel hub, wherein the disc has a through hole into which enters a distal end of the engaging projection which has entered into the insertion groove when the braking member is positioned at the released position.

In the above-described recording tape cartridge, the detent-shaped engaging projection enters into the insertion groove which is surrounded by the groove wall portion of the braking member, such that the braking member cannot rotate with respect to the case. When the braking member approaches the floor portion of the reel hub while being guided by the engaging projection, and is positioned at the meshing position at which the braking gear meshes with the gear teeth, a locked state arises in which rotation of the reel with respect to the case is impeded. On the other hand, when the braking member moves away from the floor portion of the reel hub while being guided by the engaging projection which has entered into the insertion groove, and reaches the released position at which the meshing of the braking gear and the gear teeth is released, a state arises in which rotation of the reel with respect to the case is permitted.

Here, a through hole is provided in the disc which structures the braking member. When the braking member is positioned at the released position, the distal end of the engaging projection, which has entered into the insertion groove, enters into the through hole. Thus, the amount of insertion of the engaging projection into the braking member (the insertion groove and the through hole) is large over the entire stroke of movement of the braking member. Thus, even if a clearance of a proper degree for exhibiting a guiding function while permitting movement of the braking member is provided between the engaging projection and the inner surfaces of the insertion groove and the through hole, tilting of the braking member can be kept small both at the time when rotation of the reel is locked and at the time when rotation of the reel is permitted.

In the recording tape cartridge having the above-described structure, it is possible to suppress tilting, with respect to the case, of a braking member which impedes rotation of a reel when the recording tape cartridge is not being used.

Note that the gear teeth may, for example, be provided directly at the floor surface of the reel hub and formed in an annular form, or may be provided at the distal end portions of projections which project discretely from the floor portion of the reel hub.

Further, in the first aspect, the engaging projection has a length such that the engaging projection passes through the through hole when the braking member is positioned at the released position.

In the above-described recording tape cartridge, when the braking member is positioned at the released position, the engaging projection passes through the through hole (the distal end of the engaging projection projects toward the braking gear side of the disc). Thus, the amount of insertion of the engaging projection in the braking member (the insertion groove and the through hole) is even larger over the entire stroke of movement of the braking member. Thus, tilting of the braking member can be suppressed even more both at the time when rotation of the reel is locked and at the time when rotation of the reel is permitted.

A second aspect of the present invention provides a recording tape cartridge comprising: a reel, and gear teeth are provided at an inner side of a floor portion of a reel hub on which a recording tape is wound; a case which accommodates the reel, and an engaging projection is formed at a surface of the case opposing the floor portion of the reel hub; a braking member having a disc, and a braking gear, which is annular and which can mesh with the gear teeth, is provided at one surface of the disc, and the braking member can move within the case in a direction of thickness of the case; and a groove wall portion standing erect at the disc and demarcating an insertion groove in which the engaging projection enters over an entire stroke of movement of the braking member, wherein the groove wall portion impedes rotation of the braking member with respect to the case, and guides movement of the braking member.

A third aspect of the present invention provides a method of manufacturing a recording tape cartridge having a locking mechanism locking a reel which is accommodated in a case and on which a recording tape is wound, the method comprising the steps of: (a) forming gear teeth at an inner side of a floor portion of a reel hub of the reel; (b) forming an engaging projection at a surface of the case which surface opposes the floor portion of the reel hub; (c) forming a braking member having a disc, and a braking gear, which is annular and which can mesh with the gear teeth, is provided at one surface of the disc, and a groove wall portion, which demarcates an insertion groove into which the engaging projection enters, stands erect at the disc, and the braking member can approach and move away from the floor portion of the reel hub within the case; and (d) combining the braking member and the reel within the case.

DETAILED DESCRIPTION OF THE INVENTION

Hereinafter, a recording tape cartridge 10 relating to an embodiment of the present invention will be described on the basis of FIGS. 1 through 11. First, the basic, overall structure of the recording tape cartridge 10, and the structures of an opening and a door will be described. Then, a reel 14, which is a main portion of the present invention, and a braking mechanism, which impedes rotation of the reel 14 at the time when the recording tape cartridge 10 is not in use, will be described. Note that, for convenience of explanation, the direction of loading the recording tape cartridge 10 into a drive device, which is denoted by arrow A, is the forward direction (front side) of the recording tape cartridge 10. Further, the direction of arrow B, which is orthogonal to arrow A, is the rightward direction.

Overall Structure of Recording Tape Cartridge

Figure 1:
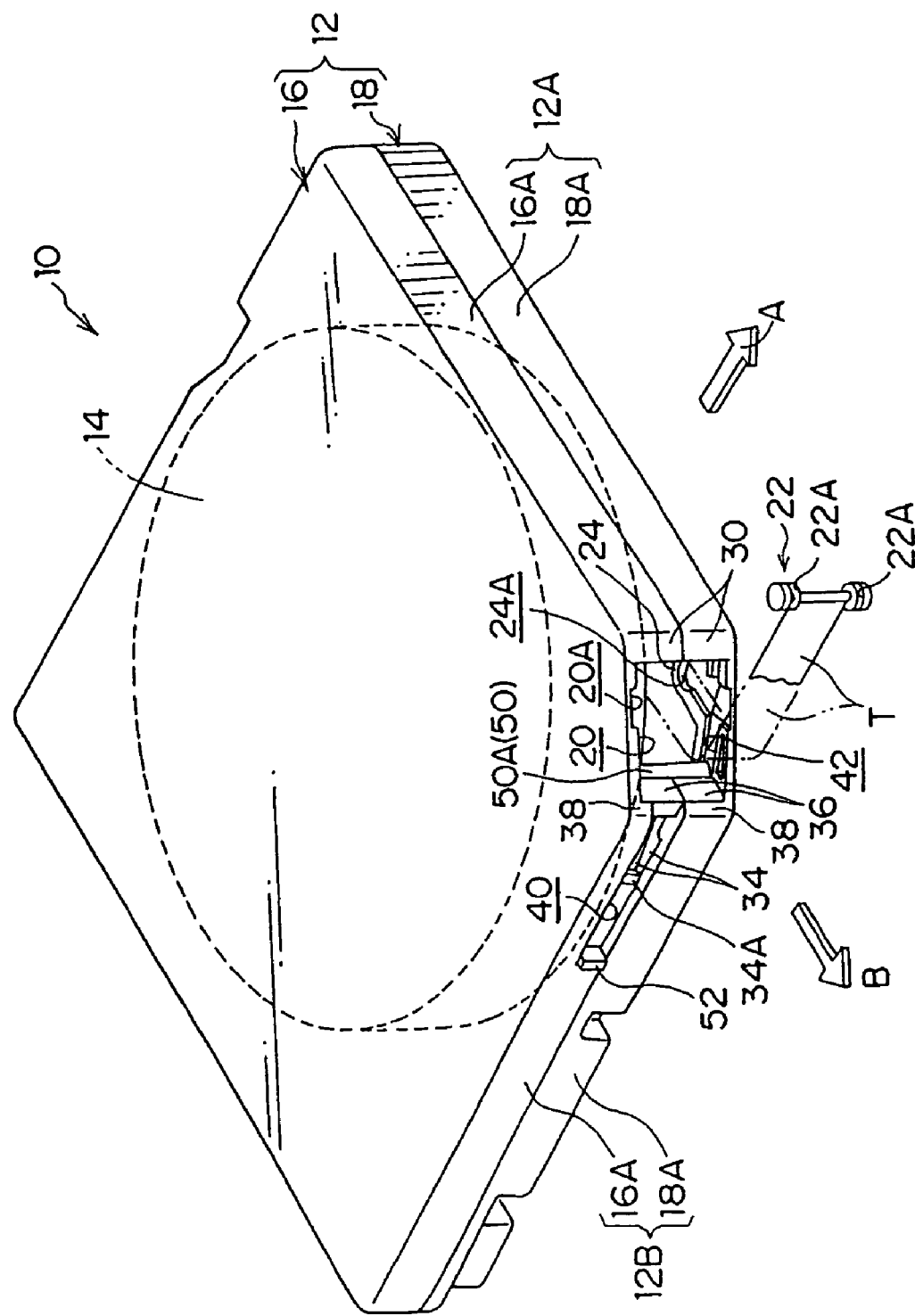
FIG. 1 is a perspective view showing the overall structure of a recording tape cartridge relating to an embodiment of the present invention.

The overall structure of the recording tape cartridge 10 is shown in perspective view in FIG. 1. A schematic exploded perspective view of the recording tape cartridge 10 is shown in FIG. 2.

Figure 2:
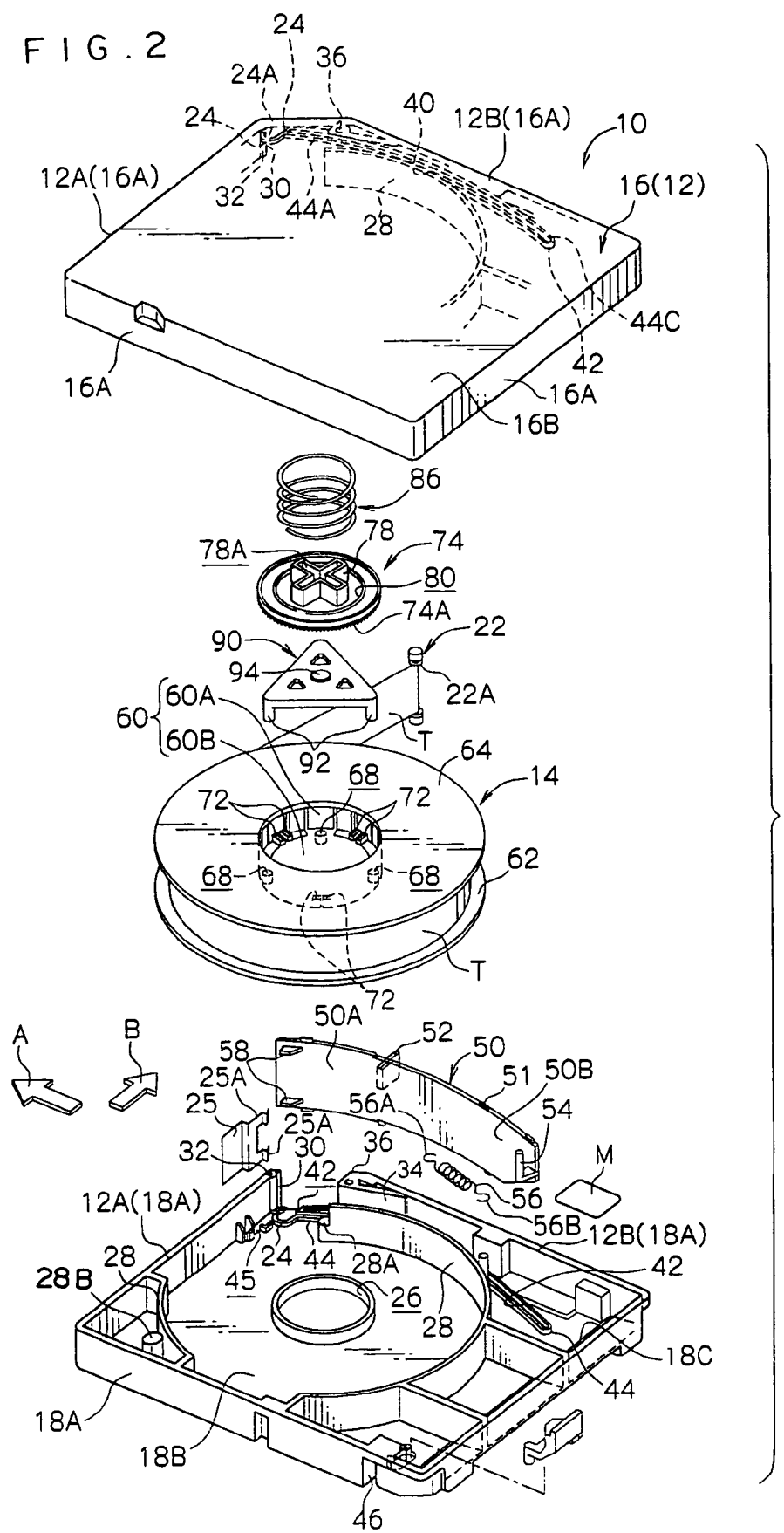
FIG. 2 is an exploded perspective view of the recording tape cartridge relating to the embodiment of the present invention.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The structure of the reel 14 will be described later.

The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut away. A space for accommodating the reel 14, on which the magnetic tape T is wound, is provided at the interior of the case 12. The corner portion of the upper case 16 and the lower case 18, at which corner portion the peripheral walls 16A, 18A have been cut away, forms an opening 20 which is for pulling-out of the magnetic tape T. The detailed structures of the opening 20 and a door 50, which opens and closes the opening 20, will be described later.

A leader pin 22, which is pulled-out while being anchored or engaged by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out mechanism. In this way, the hooks or the like do not contact and scratch the magnetic tape T at the time of pulling-out the magnetic tape T.

A pair of upper and lower pin stands 24, which position and hold the leader pin 22 within the case 12, are provided at the inner side of the opening 20 of the case 12. The pin stands 24 are formed in semi-cylindrical shapes which open in the direction of arrow B. Both end portions of the leader pin 22, which is in a state of standing upright, are held in concave portions 24A of the pin stands 24. The pin stands 24 are continuous with ribs 44 which will be described later.

A plate spring 25 is fixed in the vicinity of the pin stands 24. The plate spring 25 engages the upper and lower end portions of the leader pin 22, and holds the leader pin 22 at the pin stands 24. When the leader pin 22 enters into and exits out from the pin stands 24, arm portions 25A of the plate spring 25 are appropriately elastically deformed, such that movement of the leader pin 22 is permitted.

Further, a gear opening 26, which is for exposing a reel gear 66 (which will be described later) of the reel 14 to the exterior, is formed in the central portion of the lower case 18. The reel 14 is driven to rotate within the case 12 by the reel gear 66 meshing with a driving gear of a drive device. Further, the reel 14 is held so as to not joggle by play-restricting walls 28 which project out at portions of the inner surfaces of the upper case 16 and the lower case 18, and which serve as inner walls which are on a circular locus which is coaxial with the gear opening 26. Moreover, an annular rib 26A projects toward the inner side of the case 12 at the edge portion of the gear opening 26 at the lower case 18. The annular rib 26A is for positioning of the reel 14.

A hollow portion 28A, in which a hole for position regulation is formed, is continuous with the end portion of the play-restricting wall 28 in a vicinity of the opening 20. Further, a hollow portion 28B, in which is formed a hole for position regulation which is a long hole, stands erect in the space sandwiched between the front left corner portion of the case 12 and the play-restricting wall 28. The hollow portions 28A, 28B are disposed on a single straight line which extends along the direction of arrow B. End portions of the play-restricting walls 28, except for the end portion thereof at which the hollow portion 28A is continuous, are continuous with the peripheral wall 16A or the peripheral wall 18A of the case 12, so as to partition the outer sides of the play-restricting walls 28 and the space at which the reel 14 is set.

A memory board M, which stores various types of information, is set at the rear right portion of the lower case 18 for each recording tape cartridge 10. A portion of an inclined rear wall 18C forming the peripheral wall 18A is inclined at a predetermined angle and the memory board M is disposed so as to be inclined at a predetermined angle such that sensing is possible at a drive device, which reads information recorded on the memory board M from the bottom surface side of the case 12, and at a library device, which reads information recorded on the memory board M from the rear surface side of the case 12.

Opening, and Structure of Case in Vicinity of Opening

Figure 3:
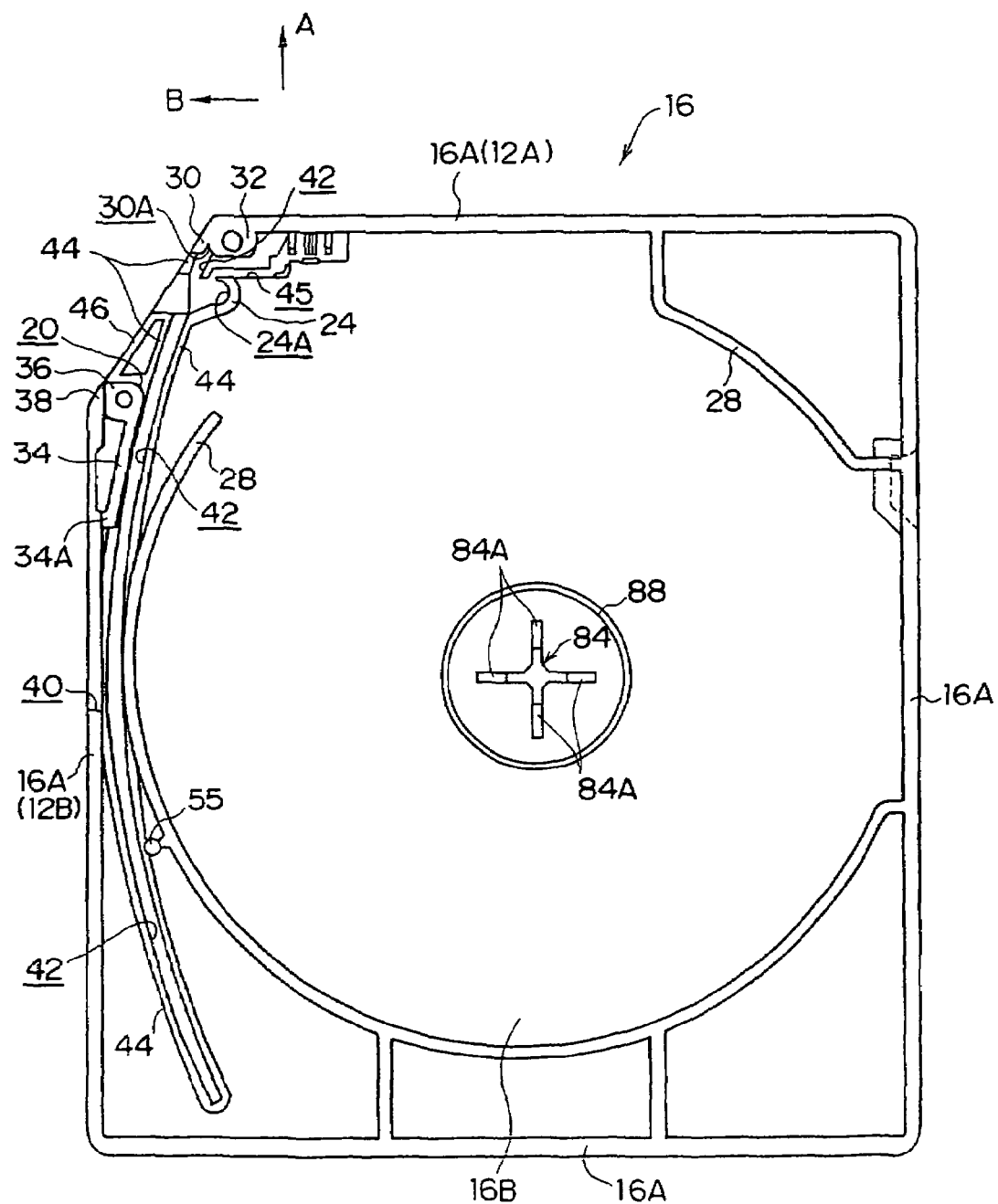
FIG. 3 is a bottom view of an upper case structuring the recording tape cartridge relating to the embodiment of the present invention.
Figure 4:
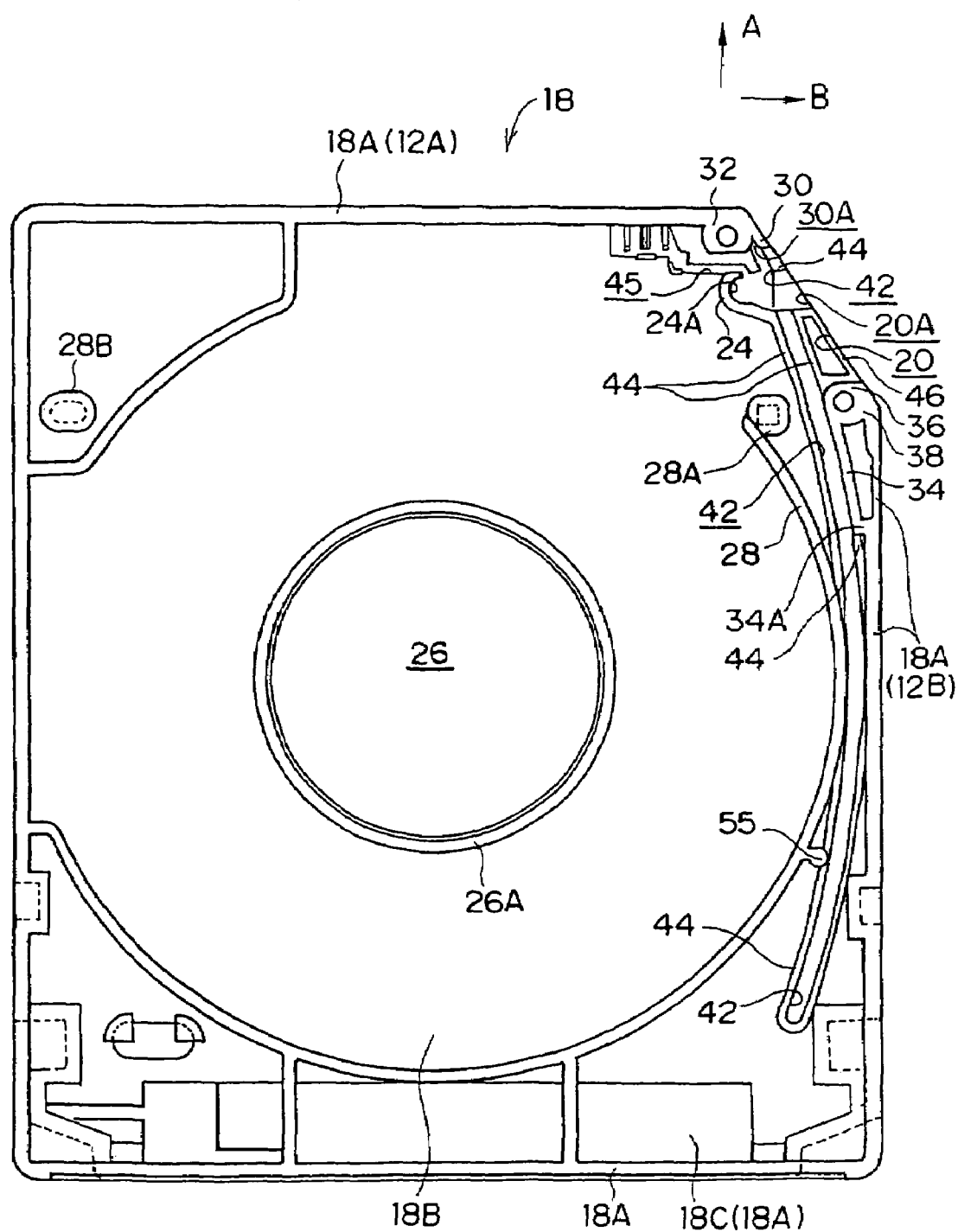
FIG. 4 is a plan view of a lower case structuring the recording tape cartridge relating to the embodiment of the present invention.

As shown in FIG. 3 (which is a bottom view of the upper case 16) and in FIG. 4 (which is a plan view of the lower case 18), a pair of upper and lower screw bosses 32 and a pair of upper and lower screw bosses 36 are provided at the front and rear edge portions of the opening 20, respectively. The screw bosses 32, 36, as well as other screw bosses which are not illustrated, are for the screwing-in of screws for joining the upper case 16 and the lower case 18.

The screw bosses 32, which are positioned at the front edge portion of the opening 20, are continuous with the right end portion of a front wall 12A of the case 12 (the front wall 12A is the portions of the peripheral walls 16A, 18A whose outer surfaces are directed in the direction of arrow A), and are continuous with a pair of upper and lower dustproofing walls 30 which are short and are bent along the plane of opening of the opening 20 from the right end portion of the front wall 12A. Concave portions 30A, into which the distal end portion of the door 50 which will be described later enters, are formed between the screw bosses 32 and the dustproofing walls 30.

The screw bosses 36, which are positioned at the rear edge portion of the opening 20, are continuous with bent walls 38 and with the front end portions of a pair of upper and lower arc-shaped walls 34. The bent walls 38 are formed such that the front end portion of a right wall 12B of the case 12 (the right wall 12B is the right side walls of the peripheral walls 16A, 18A which run along the direction of arrow A) is bent substantially along the plane of opening of the opening 20. The arc-shaped walls 34 are provided at the inner side of the right wall 12B. The upper and lower arc-shaped walls 34 are formed in an arc-shape which, in plan view, substantially corresponds to the outer peripheral surface of (i.e., the locus of movement of the outer peripheral surface of) the door 50 which will be described later. The upper and lower arc-shaped walls 34 extend rearward from the screw bosses 36 by a predetermined length, and are continuous with the right wall 12B (the peripheral wall 16A or the peripheral wall 18A) via short connecting walls 34A at the rear portions thereof.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the peripheral wall 16A which forms the right wall 12B. The slit 40 opens toward the front as well by also cutting out the lower portion of the bent wall 38 of the upper case 16.

A guide groove 42 which guides the door 50 is provided in each of the upper case 16 and the lower case 18 forming the case 12. The groove walls of the guide grooves 42 are structured by the ribs 44 standing erect at a ceiling plate 16B of the upper case 16 or a floor plate 18B of the lower case 18, the right wall 12B (either the peripheral wall 16A or the peripheral wall 18A), and the play-restricting walls 28. The guide grooves 42 are formed without making the ceiling plate 16B or the floor plate 18B thinner. The ribs 44 are continuous with the pin stands 24.

Each guide groove 42 is formed in an arc-shape which runs along a predetermined circumference whose proximal end is the concave portion 30A and which reaches the right rear corner portion of the case 12. This predetermined circumference is determined so as to pass (thread its way through) at the outer side of the screw bosses 32, the inner side of the screw bosses 36, and between the right wall 12B and the play-restricting walls 28. In the present embodiment, the central position of this predetermined circumference (i.e., the center of rotation of the door 50 which will be described later) is set such that the left-right direction position (coordinate) thereof substantially coincides with a position further toward the outer side than the left end of the case 12, and the front-back direction position (coordinate) thereof substantially coincides with the center of rotation of the reel 14 (the axial center of the play-restricting walls 28).

Further, the portion of the guide groove 42 positioned at the opening 20 is continuous with the concave portion 24A due to the rib 44 being cut-out at the right side of the pin stand 24, and is also continuous with a spring groove 45 in which the arm portion 25A of the plate spring 25 is disposed. Moreover, at the cut-out portion of the guide groove 42, a taper opening 20A, which guides the leader pin 22 into the case 12, is continuous with the concave portion 24A of the pin stand 24. In addition, a rib 46, which is formed along the rear edge of the taper opening 20A, the front edge of the screw boss 36, and the plane of opening of the opening 20, respectively, is continuous with the rib 44. In this way, the strength around the opening 20 of the case 12 can be ensured or improved.

Moreover, at the rear end of the rib 44, which forms the rear half portion of each guide groove 42, the rib 44 bends back in a substantial U shape and is closed. Moreover, the rib 44 of the upper case 16 is formed to be longer toward the rear than the rib 44 of the lower case 18. This is in order for the memory board M, which is disposed at the right wall 12B side, to not interfere with the door 50, because the inclined rear wall 18C (peripheral wall 18A) of the lower case 18 is formed as an inclined surface of a predetermined angle.

A pair of top and bottom spring catching pins 55 are provided at the longitudinally central portion of the inner side portion of the rear half portion of the rib 44. The spring catching pins 55 are continuous with the play-restricting walls 28. The spring catching pin 55 at the lower case 18 side is formed to be longer. One end side annular portion 56A of a coil spring 56 which will be described later catches on the portion of this spring catching pin 55 which projects higher than the play-restricting wall 28. The coil spring 56 is prevented from falling out due to the short spring catching pin 55 at the upper case 16 side abutting the spring catching pin 55 at the lower case 18 side.

The case 12 is formed by the upper case 16 and the lower case 18, which were described above, being fixed or joined together by unillustrated screws being screwed, from beneath, into the screw bosses 32, 36 as well as other screw bosses, in a state in which the peripheral walls 16A, 18A abut one another. Further, by forming the opening 20 by cutting away the front right corner portion, the plane of opening of the opening 20 faces in the direction of arrow A and in the direction of arrow B. Thus, the pull-out mechanism of a drive device can access and engage the leader pin 22 from the direction of arrow A, or from the direction of arrow B, or from between the direction of arrow A and the direction of arrow B. In this way, the area over which the pin stands 24 which hold the leader pin 22 can be set is broadened, and the region at which the pull-out mechanism of the drive device can engage the leader pin 22 is broadened. Thus, the positions where the pin stands 24 are disposed can be set in accordance with the specifications of the drive device which engages the leader pin 22 from the direction of arrow A or from the direction of arrow B. Therefore, the degrees of freedom in designing the drive device are increased.

Structure of Door

The above-described opening 20 is opened and closed by the door 50 which serves as a shielding member. The door 50 is formed in an arc-shape which curves along the direction of plate thickness thereof, and whose curvature as seen in plan view coincides with the curvature of the guide grooves 42 (the predetermined circumference). Further, the portion of the door 50 at the front portion thereof (at least the portion thereof which closes the opening 20) where the plate width (height) is formed to be substantially the same as the opening height of the opening 20, is a closing portion 50A. The portion of the door 50 which is at the rear side of the closing portion 50A and whose plate width is slightly smaller than that of the closing portion 50A, is a driving portion 50B.

Figure 5A:
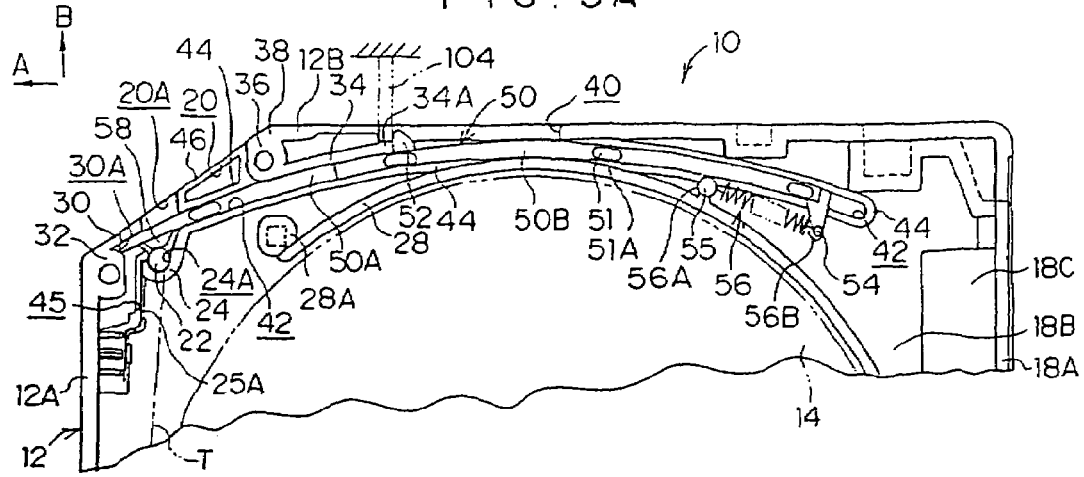
FIG. 5A is a view, as seen with the upper case removed, showing a process of opening an opening of the recording tape cartridge relating to the embodiment of the present invention, and is a plan view showing an initial state of engagement of an engaging projecting portion of a drive device with an operation projection of a door.

The plate length of the door 50 (the curved longitudinal dimension thereof) is determined such that, in the state in which the door 50 closes the opening 20, the rear end portion of the driving portion 50B is positioned in the right rear corner portion of the case 12 (see FIG. 5A). Note that the bottom rear portion of the driving portion 50B is cut obliquely in order to avoid the memory board M which is disposed at the inclined surface of the inclined rear wall 18C of the lower case 18.

The door 50 closes the opening 20 (see FIG. 5A) in a state in which the distal end portion of the closing portion 50A enters into the concave portions 30A which are positioned at the outer sides of the screw bosses 32. When the door 50 moves (rotates) substantially rearward along the guide grooves 42 so as to open the opening 20 (see FIG. 5B) and the outer peripheral surface of a vicinity of the distal end of the closing portion 50A reaches a vicinity of the inner sides of the screw bosses 36, the opening 20 is completely opened (see FIG. 5C). Further, the door 50 closes the opening 20 by rotating in the direction substantially opposite to the direction at the time of opening the opening 20.

In this way, the door 50 is curved so as to open and close the opening 20 by rotating without jutting out from the predetermined circumference which is the locus of movement of the door 50. It suffices for the center of rotation and the radius of rotation of the door 50 (i.e., the configuration of the guide grooves 42) to be appropriately determined in accordance with the positions of the front and rear edge portions of the opening 20 (the screw bosses 32, 36) which are determined by the requirements of the drive device, or in accordance with the angle of the plane of opening of the opening 20 which is determined by the requirements of the library device, or the like.

Further, a plurality of convex portions 51, which enter into the upper and lower guide grooves 42, project at the upper and lower ends of the door 50. The projecting heights of the convex portions 51 differ at the closing portion 50A and the driving portion 50B. However, the distance from the central line running along the longitudinal direction of the door 50 to the peak portion of each convex portion 51 is constant. In this way, the top and bottom convex portions 51 slide along the ceiling plate 16B or the floor plate 18B which are the floor portions of the guide grooves 42.

Projections 51A (see FIGS. 5A through 5C), whose peak portions run along the end surfaces in the direction of the plate thickness of the door 50, project at the both sides, in the direction of plate thickness of the door 50, of each convex portion 51. The projections 51A slide along the groove walls (the ribs 44 and the like) of the guide grooves 42. Note that the convex portion 51 which is positioned furthest toward the front is disposed such that, when the opening 20 is being opened or closed, it does not enter into the taper opening 20A which is continuous with the guide groove 42.

At the time when the door 50 is opening and closing the opening 20, the door 50 is guided in the guide grooves 42 by the convex portions 51 and the projections 51A, and does not jut out from the aforementioned locus of movement. The door 50 twists its way through at the outer sides of the screw bosses 32 and the inner sides of the screw bosses 36 and between the right wall 12B and the play-restricting walls 28, and reliably opens the opening 20.

The operation projection 52, which serves as an operation portion, projects along the radial direction of the door 50 at the outer peripheral portion in a vicinity of the front end (the closing portion 50A side) of the driving portion 50B of the door 50. The operation projection 52 is exposed to the exterior of the case 12 through the slit 40. Accompanying the loading (relative movement) of the recording tape cartridge 10 into a drive device, the operation projection 52 engages with an engaging projecting portion 104 which enters in from the portion of the slit 40 which opens toward the front. The operation projection 52 thereby moves the door 50 in the direction of opening the opening 20.

A substantially L-shaped spring catching portion 54 projects toward the inner surface side of the door 50 at the rear end portion of the driving portion 50B of the door 50. The upper side of the spring catching portion 54 is the free end thereof. The spring catching portion 54 is for anchoring and holding the coil spring 56 serving as an urging mechanism. Specifically, the annular portions 56A, 56B for anchoring are provided at the end portions of the coil spring 56. The spring catching pins 55 of the case 12 are inserted through the annular portion 56A such that the annular portion 56A is anchored and held at the case 12. The spring catching portion 54 is inserted through the annular portion 56B such that the annular portion 56B is anchored and held at the door 50.

In this way, the door 50 is urged in the direction of closing the opening 20 by the urging force of the coil spring 56, and usually closes the opening 20. The coil spring 56 has a length which reaches the rear right corner portion of the case 12 in the state in which the door 50 closes the opening 20 as described above. Therefore, the space between the play-restricting walls 28 and the peripheral walls 16A, 18A (the inclined rear wall 18C) at this rear right corner portion can be utilized effectively.

Stoppers 58, which abut the upper end portion side surface and the lower end portion side surface of the leader pin 22 when the opening 20 is closed, project at the inner surface of the closing portion 50A of the door 50. The stoppers 58 can reliably prevent the leader pin 22 from falling out from the pin stands 24 due to the impact of a drop or the like.

Figure 5B:
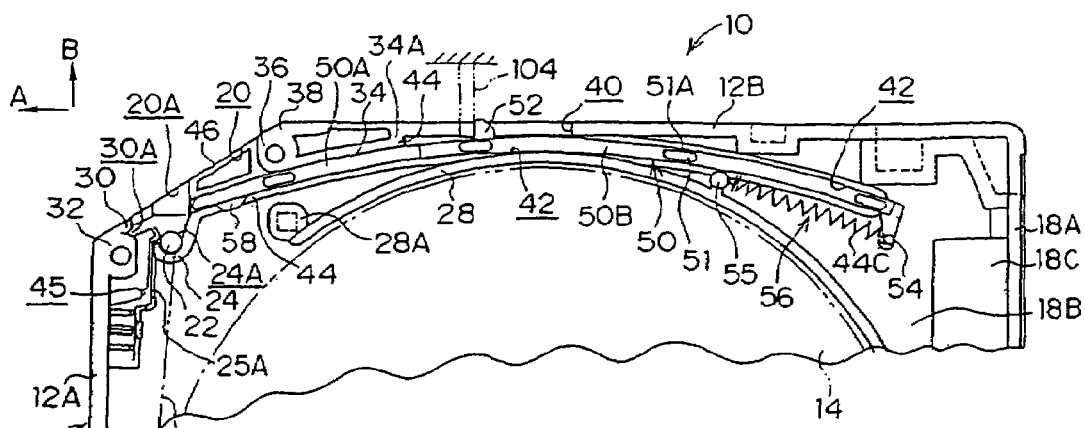
FIG. 5B is a plan view showing a state during the process of opening the opening shown in FIG. 5A.
Figure 5C:
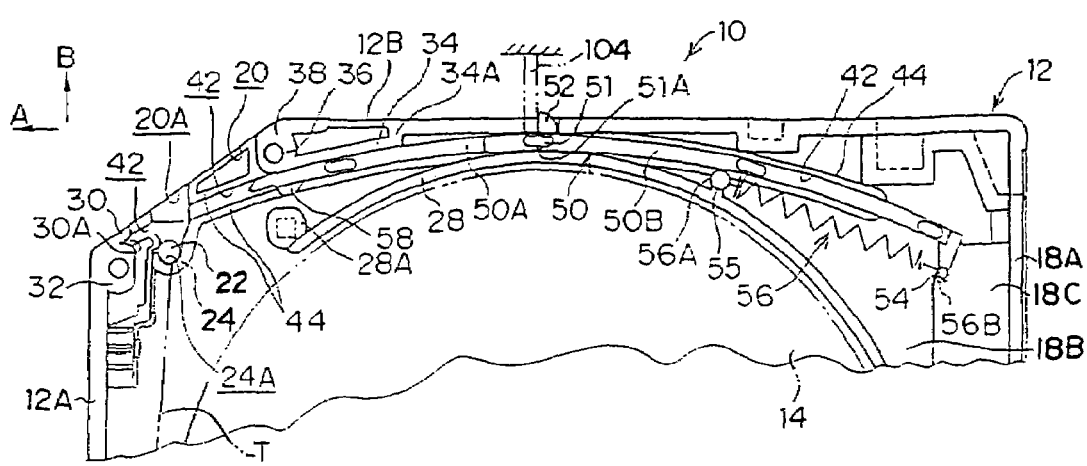
FIG. 5C is a plan view showing a state in which opening of the opening shown in FIG. 5A has been completed.

Due to the operation of the recording tape cartridge 10 being loaded into a drive device, the operation projection 52 engages with the engaging projecting portion 104 of the drive device (see FIGS. 5A through 5C). The above-described door 50 thereby moves with respect to the case 12 against the urging force of the coil spring 56, and opens the opening 20. When the recording tape cartridge 10 is to be ejected from the drive device, the door 50 closes the opening 20 due to the urging force of the coil spring 56.

Moreover, the door 50, which is curved in an arc-shape, opens and closes the opening 20 (which is inclined with respect to the direction of arrow A) by rotating so as to circle around the outer sides of the reel 14 and the pin stands 24 (the leader pin 22), without jutting out from the locus of movement which runs along the curved configuration of the door 50. The door 50 does not jut out from the region of the outer shape of the case 12 at the time of opening and closing the opening 20.

Structures of Reel and Braking Mechanism

Figure 6:
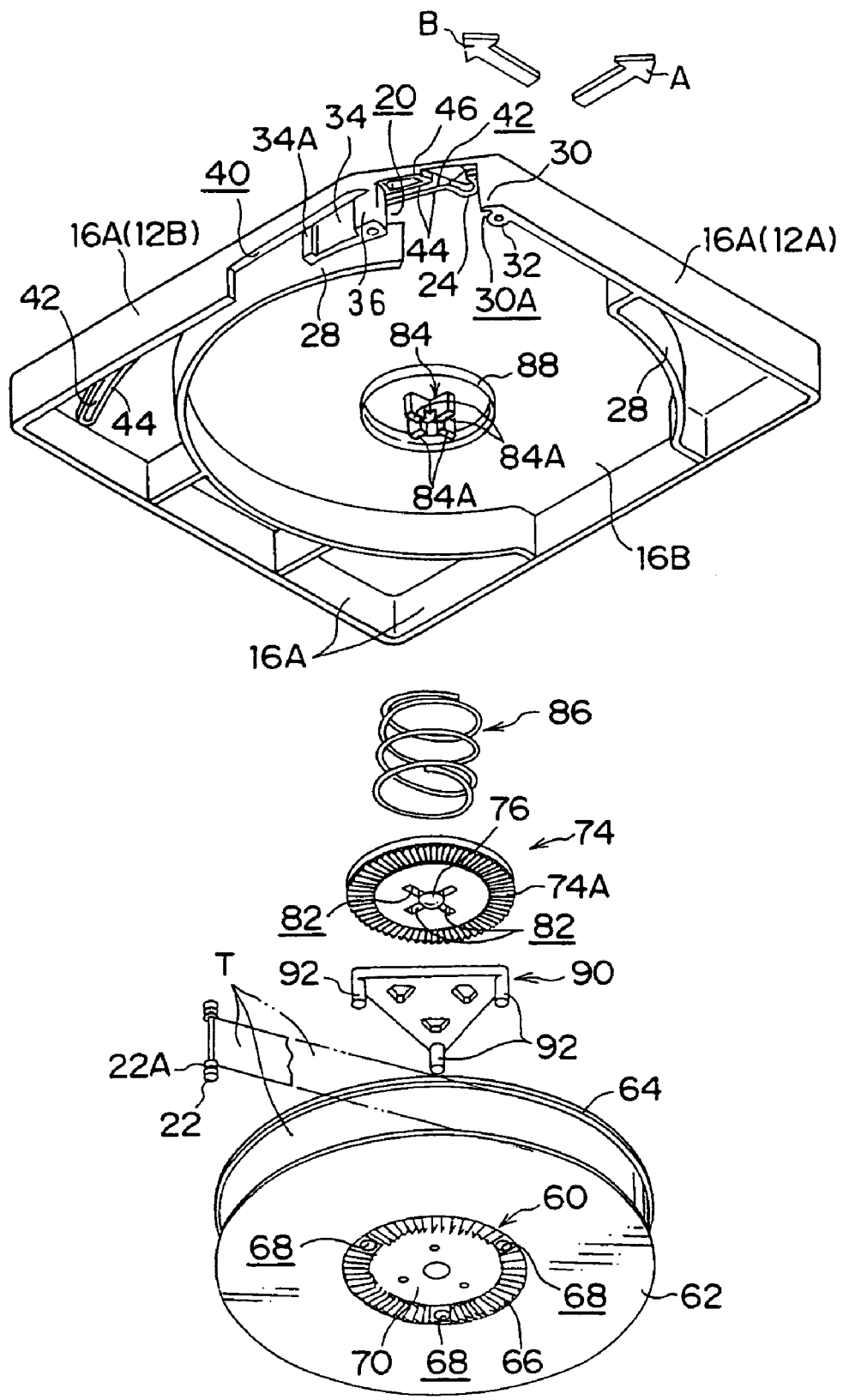
FIG. 6 is an exploded perspective view, as seen from below, showing a braking mechanism and a reel structuring the recording tape cartridge relating to the embodiment of the present invention.

As shown in FIGS. 2 and 6, the reel 14 has a reel hub 60 which is shaped as a substantial hollow cylinder having a bottom. The reel hub 60 has a tubular portion 60A, on whose outer peripheral surface the magnetic tape T is wound, and a floor portion 60B which closes the bottom portion of the tubular portion 60A. A lower flange 62 extends integrally, coaxially, and outwardly in the radial direction, from a vicinity of the floor portion 60B side end portion (i.e., the bottom end portion) of the reel hub 60. On the other hand, an upper flange 64 is joined by ultrasonic welding or the like coaxially to the upper end portion of the reel hub 60. The inner diameter of the upper flange 64 is substantially the same as the inner diameter of the tubular portion 60A, and the outer diameter of the upper flange 64 is the same as the outer diameter of the lower flange 62.

In this way, between the opposing surfaces of the lower flange 62 and the upper flange 64 at the reel 14, the magnetic tape T is wound around the outer peripheral surface of the tubular portion 60A of the reel hub 60, and the tubular portion 60A is open upwardly. The outer diameters of the lower flange 62 and the upper flange 64 are slightly smaller than the inner diameters of the play-restricting walls 28 of the case 12, such that the reel 14 can rotate within the case 12.

Figure 7:
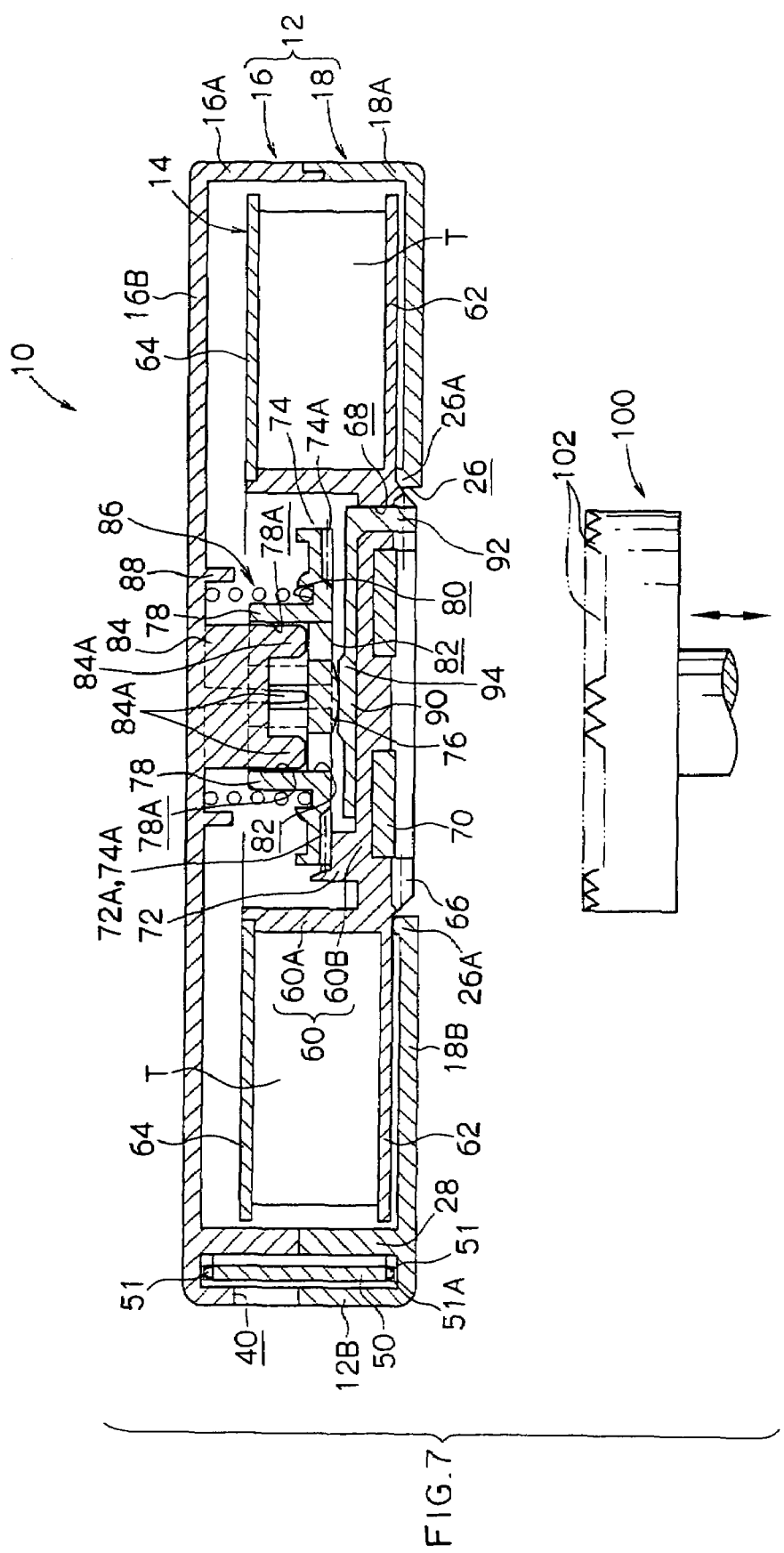
FIG. 7 is a cross-sectional view showing a rotation locked state of the reel in the recording tape cartridge relating to the embodiment of the present invention.

Further, as shown in FIG. 7, the bottom end portion of the floor portion 60B of the reel hub 60 projects slightly more than the bottom surface of the lower flange 62. A reel gear 66, which is formed in an annular form, is provided in a vicinity of the outer periphery of this bottom end portion. The reel gear 66 can mesh with a driving gear 102 which is provided at the distal end of a rotating shaft 100 of a drive device.

Through holes 68, which pass through the floor portion 60B (the reel gear 66) are provided at three places which are spaced apart uniformly on a circumference at the region where the reel gear 66 is set. The diameter of each through hole 68 is larger than the gear pitch of the reel gear 66. The teeth of the reel gear 66 are not provided around each through hole 68.

Moreover, a reel plate 70, which is an annular plate formed of a magnetic material which can be attracted by a magnet, is provided integrally by insert molding at the inner side of the reel gear 66 at the bottom end surface of the floor portion 60B of the reel hub 60.

The bottom end portion of the floor portion 60B of the reel hub 60, which bottom end portion projects further than the lower flange 62, enters into (is fit with play in) the gear opening 26 of the case 12 in a state in which the radial direction inner end portion of the lower flange 62 abuts the top end portion of the annular rib 26A. In this way, the reel gear 66 and the reel plate 70 are exposed to the exterior of the case 12.

On the other hand, pairs of anchor projections 72 stand erect so as to be spaced evenly apart on a circumference at three places, between the respective insert holes 68, at the top surface of the floor portion 60B of the reel hub 60 (see FIG. 2). (Namely, there are a total of six anchor projections 72.) A gear tooth 72A is formed at the distal end portion (the top end portion) of each anchor projection 72 (see FIG. 8). The gear teeth 72A can mesh with a braking gear 74A of a braking member 74 which will be described next.

The recording tape cartridge 10 is equipped with a braking mechanism for impeding rotation of the reel 14 when the recording tape cartridge 10 is not in use. This braking mechanism has the braking member 74 serving as a braking member. The braking member 74 is formed in a substantial disc shape. The braking gear 74A, which can mesh with the gear teeth 72A of the reel 14, is formed in an annular form in a vicinity of the outer periphery of the lower end surface of this disc portion.

A sliding-contact projecting portion 76, which abuts a release pad 90 which will be described later, projects at the axially central portion of the bottom surface of the brake member 74. The sliding-contact projecting portion 76 is shaped as a substantially spherical surface, and substantially point-contacts the release pad 90.

Figure 9A:
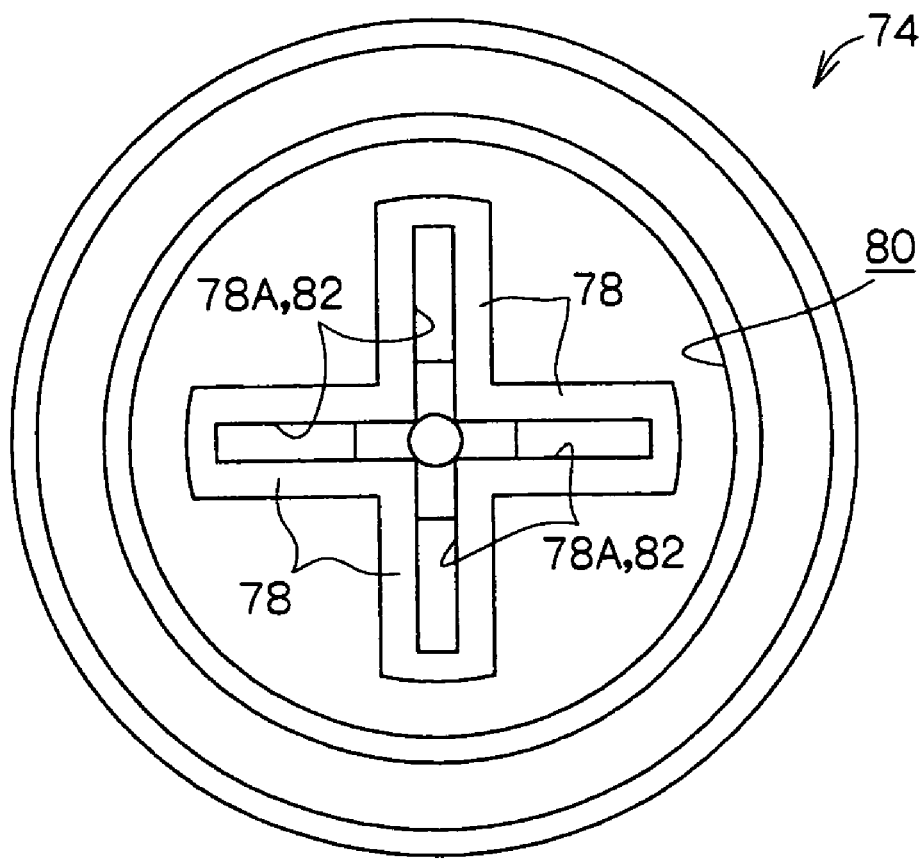
FIG. 9A is a plan view showing a braking member structuring the recording tape cartridge relating to the embodiment of the present invention.
Figure 9B:
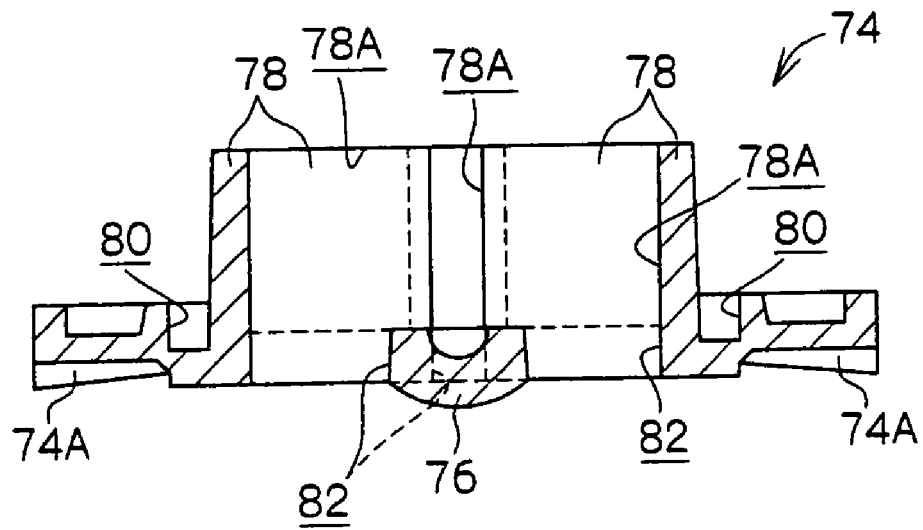
FIG. 9B is a side sectional view of the braking member of FIG. 9A.

On the other hand, as shown in FIG. 9A, a cross-shaped projection 78 serving as a groove wall portion stands erect at the top surface of the braking member 74. An insertion groove 78A, which is substantially cross-shaped in plan view, is formed at the inside of the cross-shaped projection 78. Further, a spring receiving recess 80, which is surrounded by a wall portion which is annular as seen in plan view, is formed at the outer side of the cross-shaped projection 78 at the top surface of the brake member 74.

Through holes 82 are provided in the plate thickness portion (the disc portion) of the braking member 74. Four of the through holes 82 are formed so as to communicate with the braking member 74 radial direction outer side portions of the insertion groove 78A (which is formed in a cross shape in plan view), except for the intersection portion which is the axially central portion of the insertion groove 78A. The through holes 82 are formed in rectangular shapes corresponding to these portions. The respective through holes 82 are positioned at the radial direction outer side of the sliding-contact projecting portion 76, and pass through the braking member 74 in the direction of plate thickness thereof.

The braking member 74, which is structured as described above, is inserted into the tubular portion 60A of the reel hub 60 so as to be substantially coaxial with the reel 14 and so as to be movable in the vertical directions, i.e., the axial direction of the reel 14. Namely, due to the braking member 74 moving in the vertical directions, the braking gear 74A can move between a position of meshing with the gear teeth 72A of the anchor projections 72 which are provided at the reel hub 60 (i.e., a rotation locked position which is a meshing position), and a position at which the aforementioned meshing is released (i.e., a released position).

Further, a cross-shaped rib 84 (see FIGS. 3 and 6), which serves as an engaging projection and projects downward from the ceiling plate 16B of the case 12, enters into the insertion groove 78A of the cross-shaped projection 78 of the braking member 74. The cross-shaped rib 84 is shaped as a detent which is formed as if two thin plate pieces intersect one another perpendicularly. Due to the cross-shaped rib 84 engaging with the cross-shaped projection 78 (the groove walls of the insertion groove 78A), rotation of the braking member 74 with respect to the case 12 is impeded.

In this way, in the state in which the braking gear 74A of the braking member 74 meshes with the gear teeth 72A of the reel hub 60, the braking member 74 impedes rotation of the reel 14. Note that the cross-shaped rib 84 is maintained in a state of being inserted in the insertion groove 78A along the entire vertical direction stroke of movement of the braking member 74, and also functions to guide the braking member 74 in the vertical directions.

The cross-shaped rib 84 has, at the bottom end portion thereof, projecting pieces 84A which extend from positions corresponding to the through holes 82 of the braking member 74. The widths of the respective projecting pieces 84A (the widths in the radial direction of the braking member 74) are narrow in accordance with the longitudinal dimensions of the respective through holes 82, so that the projecting pieces 84A can enter into respectively different through holes 82.

When the braking member 74 is positioned at the rotation locked position, the projecting pieces 84A are positioned within the insertion groove 78A. When the braking member 74 is positioned at the released position, the projecting pieces 84A enter into the respective through holes 82 and project from the bottom surface of the braking member 74 (i.e., pass through the through holes 82).

Namely, due to the projecting pieces 84A being formed so as to extend, the cross-shaped rib 84 not only impedes rotation of the braking member 74 with respect to the case 12, but also, the amount thereof which is engaged with the braking member 74 (the depth of insertion thereof into the braking member 74) is greatly increased, and the cross-shaped rib 84 suppresses tilting of the braking member 74 with respect to the case 12. Further, the cross-shaped rib 84 which has this structure has an improved ability to guide the braking member 74 in the vertical directions.

Figure 8:
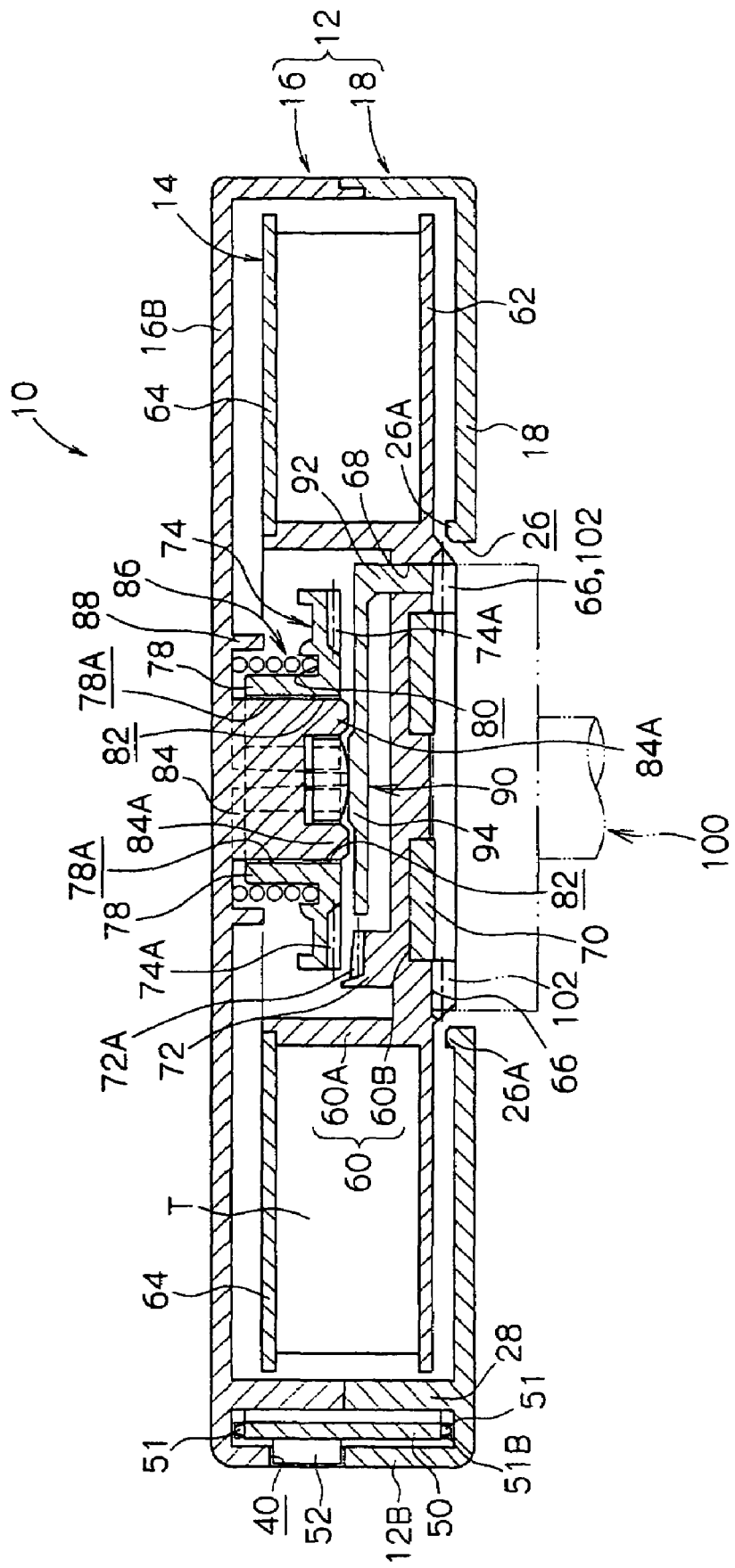
FIG. 8 is a cross-sectional view showing a rotatable state of the reel in the recording tape cartridge relating to the embodiment of the present invention.

Note that, in the present embodiment, the engaged amount, in the axial direction, of the cross-shaped rib 84 (including the projecting pieces 84A) with the braking member 74 which is positioned at the rotation locked position, is set so as to be sufficiently larger than the entire stroke of movement of the braking member 74 (see FIGS. 7 and 8).

Further, a compression coil spring 86 serving as an urging mechanism is disposed between the ceiling plate 16B and the spring receiving recess 80 of the braking member 74. One end portion of the compression coil spring 86 enters into the spring receiving recess 80, whereas the other end portion of the compression coil spring 86 enters in at the inner side of an annular wall portion 88 which projects from the outer side of the cross-shaped rib 84 at the ceiling plate 16B. The position of the compression coil spring 86 does not become offset in the radial direction.

Due to the urging force of the compression coil spring 86, the braking member 74 is urged downward, and usually, the braking gear 74A meshes with the gear teeth 72A such that inadvertent rotation of the reel 14 is reliably prevented (i.e., the braking member 74 is positioned at the rotation locked position). Further, due to this urging force, the reel 14, which meshes with the braking member 74 at the anchor projections 72, also is urged downward, and, as described above, the lower flange 62 abuts the annular rib 26A such that the reel 14 does not joggle within the case 12.

The release pad 90, which serves as a releasing member, is disposed between the braking member 74 and the floor portion 60B within the reel hub 60 (the tubular portion 60A) of the reel 14. The release pad 90 is formed in the shape of a flat plate which substantially is an equilateral triangle as seen in plan view. Three leg portions 92, which are solid cylindrical and correspond to the through holes 68 of the floor portion 60B, project from the bottom surface of the release pad 90 in vicinities of the respective vertices. A sliding-contact projecting portion 94, which abuts the sliding-contact projecting portion 76 of the braking member 74, projects from the central portion of the top surface of the release pad 90.

In the state in which the respective leg portions 92 are inserted through the through holes 68 so as to be movable in the vertical directions, the release pad 90 is placed on the floor portion 60B of the reel hub 60 so as to not interfere with the anchor projections 72 (i.e., the bottom surface of the release pad 90 abuts the top surface of the floor portion 60B). In this state, the leg portions 92 project further than the bottom end portions of the through holes 68, such that the distal ends of the leg portions 92 and the addendum of the reel gear 66 are substantially the same level. Due to the sliding-contact projecting portion 94 of the release pad 90 abutting the sliding-contact projecting portion 76 of the braking member 74, the release pad 90 maintains the above-described projected state of the leg portions 92 due to the urging force of the compression coil spring 86.

On the other hand, when the leg portions 92 are pushed upward against the urging force of the compression coil spring 86, the release pad 90 pushes up the braking member 74 which the release pad 90 is abutting at the sliding-contact projecting portion 94 thereof. The meshing of the braking gear 74A and the gear teeth 72A of the anchor projections 72 is released (the braking member 74 is moved to the released position).

Specifically, when the driving gear 102 meshes with the reel gear 66 of the reel 14, due to the rotating shaft 100 moving upward relative to the case 12, the leg portions 92 of the release pad 90 are pushed by the addendum of the driving gear 102. In this way, accompanying the meshing of the driving gear 102 with the reel gear 66, the reel 14 floats up within the case 12 against the urging force of the compression coil spring 86 (the lower flange 62 is moved away from the annular rib 26A). Simultaneously, the state in which rotation is impeded by the braking member 74 is released, such that the reel 14 becomes able to rotate within the case 12.

Note that, in this state, the leg portions 92 of the release pad 90 are positioned within the through holes 68 of the reel hub 60, and when the rotating shaft 100 rotates, the release pad 90 rotates together with the reel 14. Thus, the braking member 74 and the release pad 90 rotate relative to one another at the time when the reel 14 is rotating, and the sliding-contact projecting portions 76, 94 thereof (which are the regions thereof which abut one another) slidingly contact one another.

Next, operation of the present embodiment will be described.

When the recording tape cartridge 10 having the above-described structure is not being used (e.g., is being stored or transported or the like), the door 50, whose distal end portion has entered into the concave portions 30A due to the urging force of the coil spring 56, closes the opening 20.

Further, as shown in FIG. 7, at the reel 14, the reel gear 66 is exposed from the gear opening 26 while the lower flange 62 is being pushed against or is being made to abut the annular rib 26A due to the urging force of the compression coil spring 86 which is transmitted via the release pad 90 and the braking member 74 which meshes with the anchor projections 72.

Due to the urging force of the compression coil spring 86, the braking gear 74A of the braking member 74 meshes with the gear teeth 72A of the anchor projections 72, and rotation of the reel 14 with respect to the case 12 is impeded. Namely, the braking member 74 is positioned at the rotation locked position.

On the other hand, when the magnetic tape T is to be used, the recording tape cartridge 10 is loaded into a bucket (not illustrated) of a drive device along the direction of arrow A. Accompanying this loading, the engaging projecting portion 104 (see FIGS. 5A through 5C), which is fixed to the bucket, engages with the operation projection 52 of the door 50. The door 50 thereby rotates substantially rearward and opens the opening 20.

When the recording tape cartridge 10 is loaded to a predetermined depth in the bucket, the bucket is lowered.

The rotating shaft 100 of the drive device relatively approaches the gear opening 26 of the case 12 (i.e., relatively moves upward), and holds the reel 14. Specifically, the driving gear 102 meshes with the reel gear 66 while the reel plate 70 is attracted and held by the magnet (not illustrated) disposed at the distal end portion of the rotating shaft 100.

Accompanying this meshing of the reel gear 66 and the driving gear 102, the addendum of the driving gear 102 abut the distal ends (lower end surfaces) of the leg portions 92 of the release pad 90, and push the release pad 90 upward against the urging force of the compression coil spring 86. In this way, the braking member 74, which is abutting the release pad 90 at the sliding-contact projecting portion 76, is also moved upward. The meshing of the braking gear 74A of the braking member 74 and the gear teeth 72A of the anchor projections 72 is released.

When the rotating shaft 100 moves further upward, the reel 14 is, against the urging force of the compression coil spring 86, raised upward together with the release pad 90 and the braking member 74 (with the relative positions thereof remaining unchanged), and the lower flange 62 moves apart from the annular rib 26A. In this way, the reel 14 floats up within the case 12, and becomes able to rotate in a state in which it does not contact the inner surfaces of the case 12. At this time, the braking member 74 is positioned at the released position, and the projecting pieces 84A of the cross-shaped rib 84 pass through the through holes 82 of the braking member 74.

Further, due to the bucket being lowered, the recording tape cartridge 10 is positioned within the drive device. In this state, the pull-out mechanism of the drive device pulls the leader pin 22 out from the opening 20 which has been opened, and accommodates the leader pin 22 at a take-up reel of the drive device. When the drive device drives and rotates the take-up reel and the reel 14 (the rotating shaft 100) synchronously, the magnetic tape T is successively pulled-out from the case 12 while being taken-up onto the take-up reel. Information is recorded or played-back by a recording/playback head or the like disposed along a predetermined tape path.

At this time, the sliding-contact projecting portion 76 of the braking member 74, which cannot rotate with respect to the case 12, slidingly contacts the sliding-contact projecting portion 94 of the release pad 90 which, together with the reel 14, rotates with respect to the case 12.

On the other hand, when the magnetic tape T is rewound onto the reel 14 and the leader pin 22 is held at the pin stands 24, the magnetic force of the magnet is cancelled, the attraction between the rotating shaft 100 and the reel plate 70 is cancelled, and the bucket, in which the recording tape cartridge 10 is loaded, is raised.

Thus, the meshing of the reel gear 66 and the driving gear 102 is cancelled, and the abutment of the driving gear 102 and the leg portions 92 of the release pad 90 is cancelled. Due to the urging force of the compression coil spring 86, the release pad 90 moves downward together with the braking member 74 (i.e., while the state in which the release pad 90 and the braking member 74 abut one another is maintained).

In this way, the respective leg portions 92 of the release pad 90 project from the through holes 68 to the region where the reel gear 66 is formed, and the braking gear 74A of the braking member 74 meshes with the gear teeth 72A of the anchor projections 72. Namely, the braking member 74 returns to the rotation locked position at which the braking member 74 impedes rotation of the reel 14.

Moreover, accompanying the movement of the braking member 74 and the release pad 90 due to the urging force of the compression coil spring 86, the reel 14 also moves downward. The reel 14 returns to the initial state in which the reel gear 66 is exposed from the gear opening 26 while the lower flange 62 of the reel 14 abuts the annular rib 26A.

Further, when the recording tape cartridge 10 is to be ejected from the bucket, the recording tape cartridge 10 is moved in the direction opposite to the direction of arrow A by the urging force of the coil spring 56 or by an unillustrated ejecting mechanism. Accompanying this movement, the door 50 closes the opening 20 due to the urging force of the coil spring 56. In this way, the recording tape cartridge 10 is ejected from the drive device and returned to its initial state.

Here, because the through holes 82 are provided at the braking member 74, the amount of insertion, in the axial direction, of the cross-shaped rib 84 into the braking member 74 can be greatly increased at each position of the braking member 74 which moves in the vertical directions, while ensuring the stroke of movement of the braking member 74 from the rotation locked position to the released position within the limited space within the case 12 (the range of the vertical direction dimension of the interior of the case 12).

In particular, the projecting pieces 84A are lengths such that they pass through the through holes 82 of the braking member 74 which is positioned at the released position. Thus, by providing the projecting pieces 84A at the cross-shaped rib 84, the amount of insertion, in the axial direction, of the cross-shaped rib 84 into the braking member 74 can be even more greatly increased at the respective positions of the braking member 74 which moves in the vertical directions.

In this way, even if a clearance of a proper degree for exhibiting a guiding function while permitting movement of the braking member 74, is provided between the cross-shaped rib 84 and the inner surfaces of the cross-shaped projection 78 (the groove wall of the insertion groove 78A) and the through holes 82, tilting of the braking member 74 can be kept small both at the time when rotation of the reel 14 is locked and at the time when rotation of the reel 14 is permitted.

Figure 10:
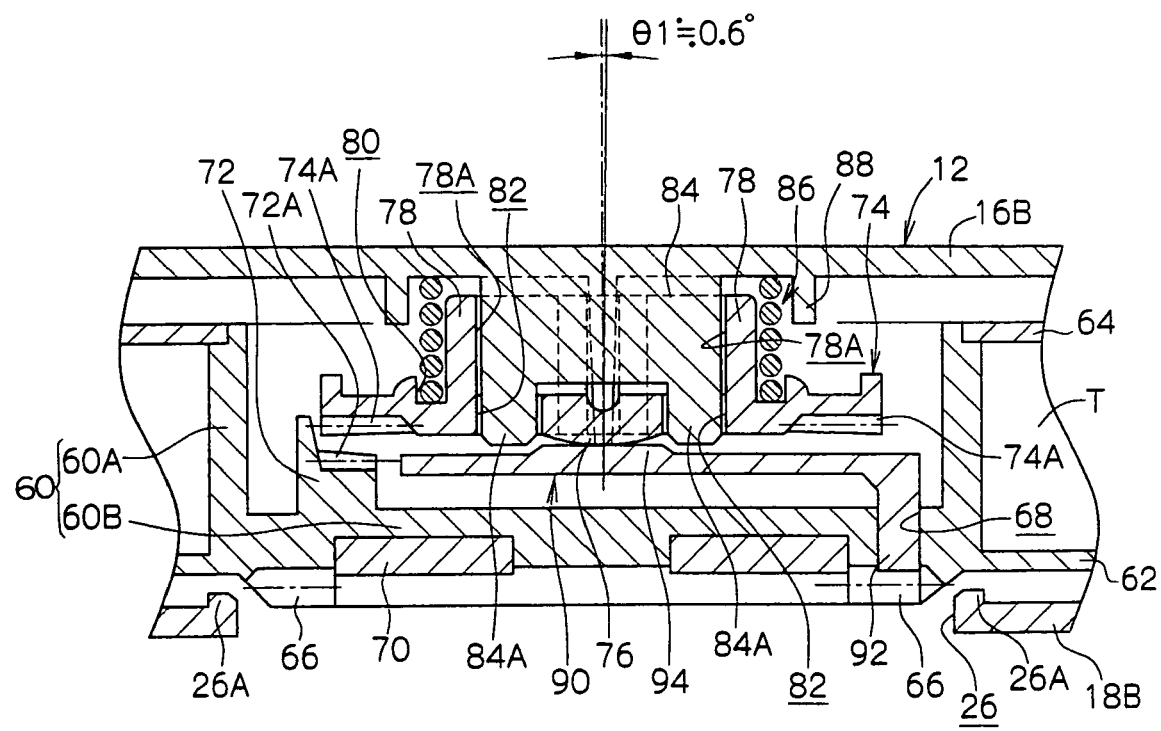
FIG. 10 is an enlarged sectional view of main portions, showing a maximum inclined state of the braking member with respect to a case in the rotatable state of the reel in the recording tape cartridge relating to the embodiment of the present invention.
Figure 11:
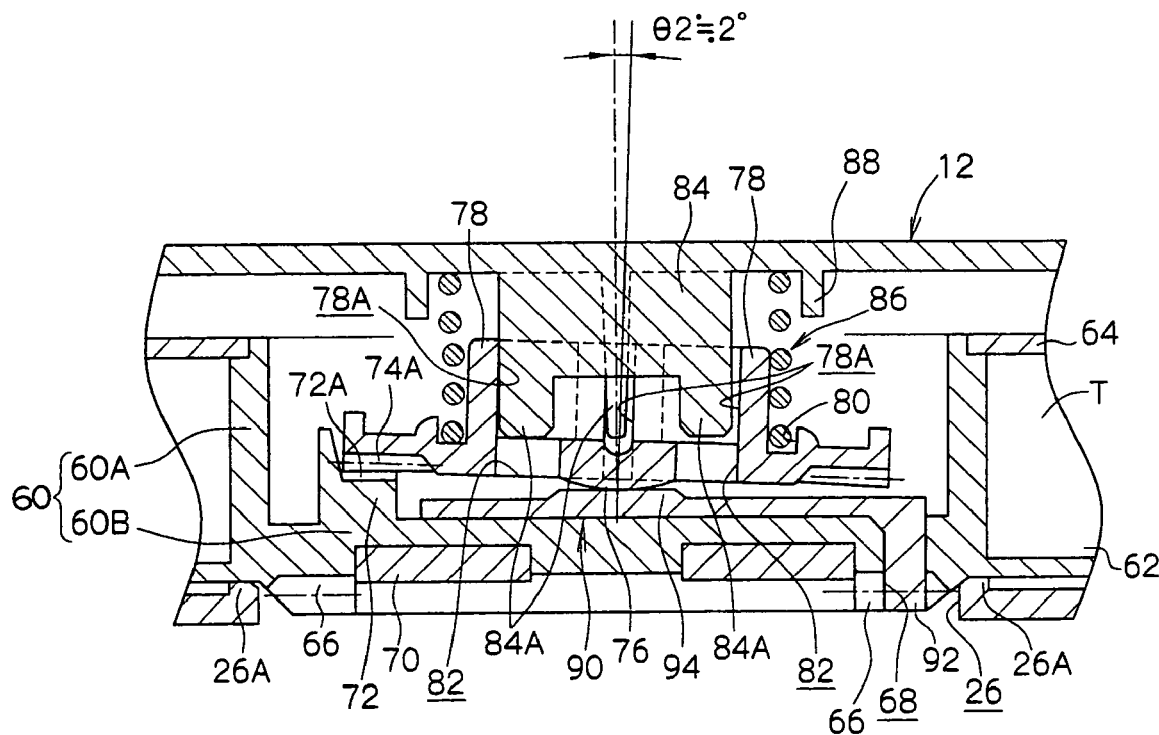
FIG. 11 is an enlarged sectional view of main portions, showing a maximum inclined state of the braking member with respect to the case in the rotation locked state of the reel in the recording tape cartridge relating to the embodiment of the present invention.
Figure 12:
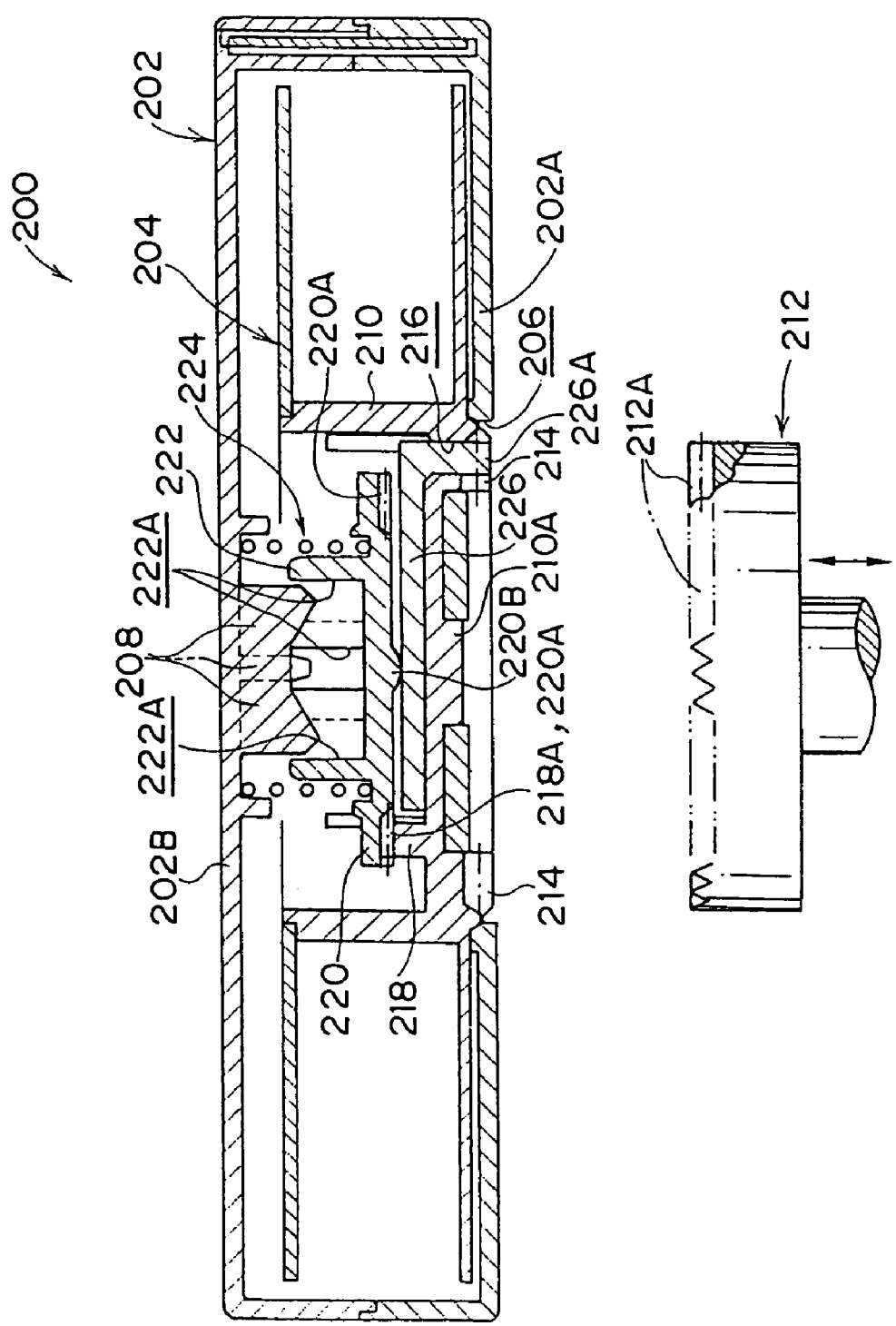
FIG. 12 is a cross-sectional view showing a rotation locked state of a reel in a conventional recording tape cartridge.
Figure 13:
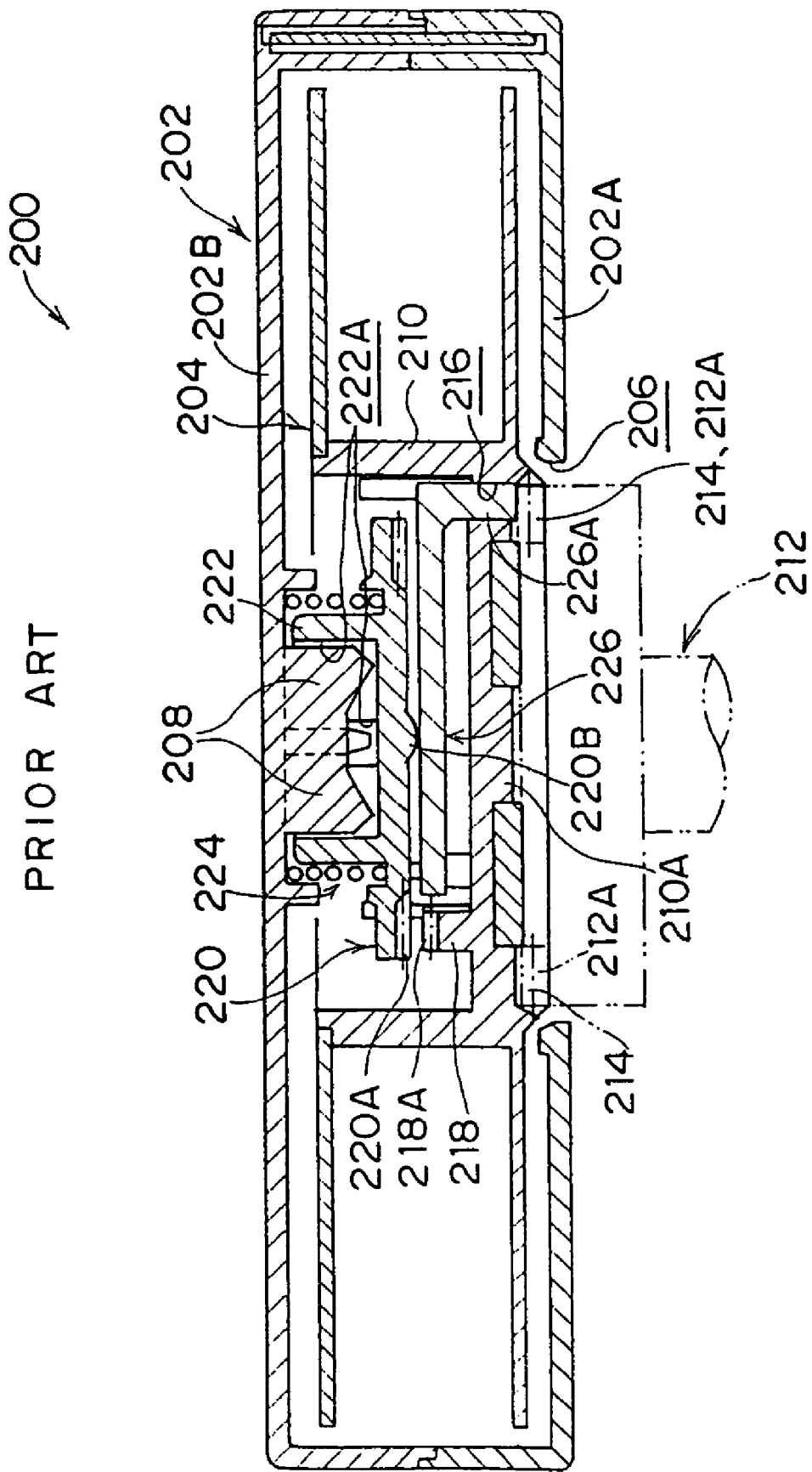
FIG. 13 is a cross-sectional view showing a rotatable state of the reel in the conventional recording tape cartridge.
Figure 14A:
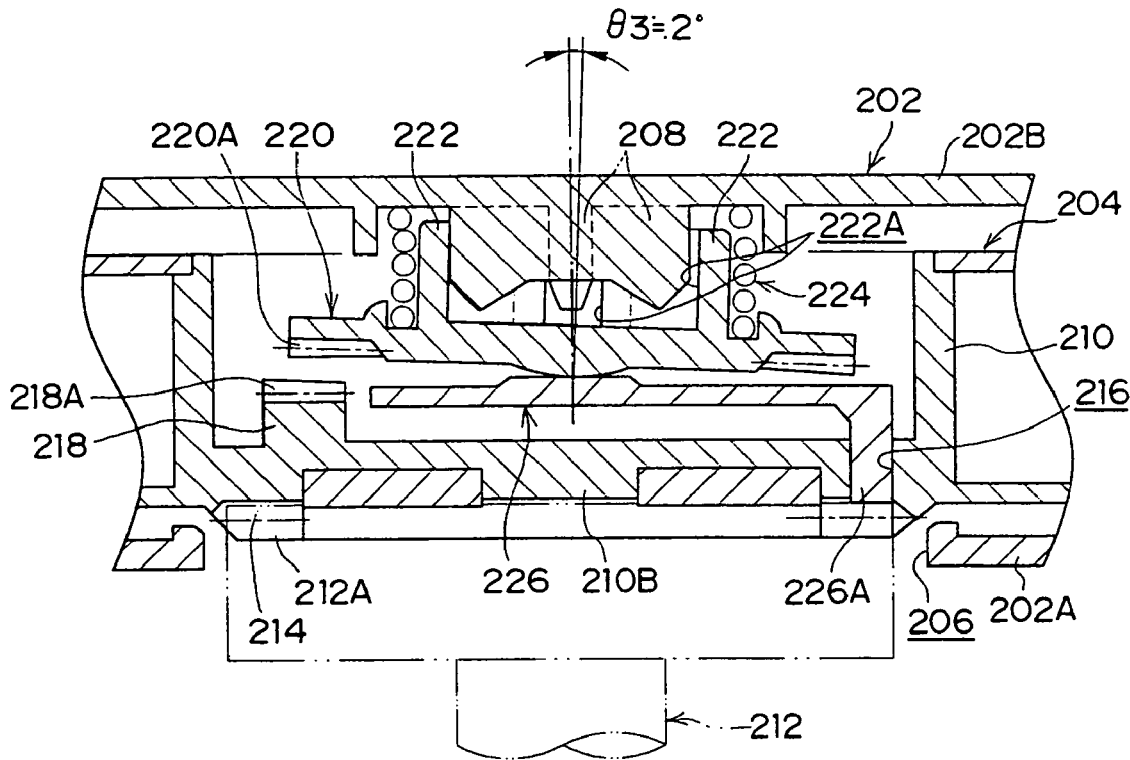
FIG. 14A is a view showing a maximum inclined state of a braking member with respect to a case in the conventional recording tape cartridge, and is an enlarged sectional view of main portions showing the rotatable state of the reel.
Figure 14B:
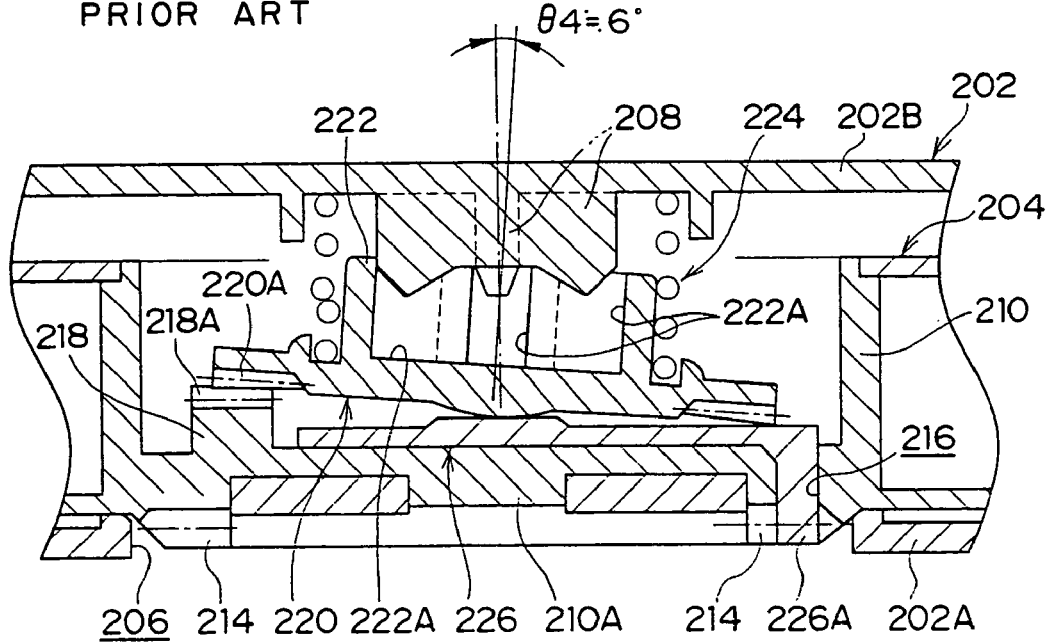
FIG. 14B is an enlarged sectional view of main portions, showing the rotation locked state of the reel shown in FIG. 14A.

Specifically, as shown in FIG. 10, a maximum angle of inclination θ1 of the braking member 74 with respect to the case 12 (in a case in which the braking member 74 tilts so as to enter in between two of the anchor projections 72) at the time when the reel 14 rotates (the time when rotation of the reel 14 is permitted) is substantially 0.6°. This is greatly suppressed as compared with the substantially 2° of the conventional recording tape cartridge 200. On the other hand, as shown in FIG. 11, when rotation of the reel 14 of the recording tape cartridge 10 is locked, a maximum angle of inclination θ2 of the braking member 74 with respect to the case 12 is substantially 2°. This is greatly suppressed as compared with the substantially 6° of the conventional recording tape cartridge 200. Note that these results are examples, and it goes without saying that the maximum angle of inclination of the braking member 74 with respect to the case 12 depends on the clearance between the cross-shaped rib 84 and the inner surfaces of the insertion groove 78A and the through holes 82.

In this way, in the tape cartridge relating to the embodiment of the present invention, it is possible to suppress tilting, with respect to the case 12, of the braking member 74 which impedes rotation of the reel 14 when the tape cartridge is not in use.

In this way, when the recording tape cartridge 10 is not being used (e.g., is being stored or transported or the like), even if the reel 14 attempts to tilt within the case 12 due to the exposed region of the reel 14 being pushed or the like by a person's hand or due to the impact of a drop, it is difficult for the meshing of the braking gear 74A of the braking member 74 and the gear teeth 72A of the reel 14, i.e., the rotation locked state of the reel 14, to be released. Moreover, because the braking member 74 hardly follows the tilting of the reel 14 at all, it is possible to suppress tilting of the reel 14 with respect to the case 12 by the braking member 74. On the other hand, at the time when the reel 14 is driven to rotate, it is difficult for the center of the braking member 74, which slidingly contacts the release pad 90, to become offset. Therefore, the braking member 74 does not shake, and noise is not generated. Moreover, the ability of the cross-shaped rib 84 to guide the braking member 74 is improved. Therefore, even in a case in which, for example, the end portion of the compression coil spring 86 does not accurately orthogonally intersect the axial direction, it is difficult for problems in the meshing of the braking gear 74A and the gear teeth 72A at the time when the braking member returns from the released position to the rotation locked position, to arise.

Note that, in the present embodiment, the projecting pieces 84A of the cross-shaped rib 84 pass through the through holes 82 of the braking member 74 which is positioned at the released position (i.e., the projecting pieces 84A project at the bottom surface side of the braking member 74). However, the present invention is not limited to the same, and the distal ends of the projecting pieces 84A may be positioned within the through holes 82 of the braking member 74 which is positioned at the released position.

Moreover, in the above-described embodiment, the case 12 is provided with the cross-shaped rib 84 which serves as an engaging projection, and the braking member 74 has the insertion groove 78A (the cross-shaped projection 78) which has a shape corresponding to the cross-shaped rib 84. However, the present invention is not limited by the configurations of the engaging projection and the insertion groove. Namely, the configurations, the arrangement and the like of the engaging projection and the insertion groove are not limited, provided that the rotation of the braking member 74 with respect to the case 12 is impeded and the braking member 74 is guided in the vertical directions due to the engaging projection entering into the insertion groove.

In addition, in the above-described embodiment, the recording tape cartridge 10 is provided with the release pad 90 for releasing the state in which rotation of the reel 14 is locked by the braking member 74. However, the present invention is not limited to the same. For example, a structure is possible in which the braking member 74 is moved to the released position by the sliding-contact projecting portion 76 of the braking member 74 being directly pushed by a releasing projection of the rotating shaft 100 which enters in from a through hole formed in the axially central portion of the floor portion 60B of the reel hub 60. In this case, the anchor projections 72 for providing the gear teeth 72A at positions which do not interfere with the release pad 90 are not provided, and the gear teeth can be provided in an annular form at the floor portion 60B of the reel hub 60.

Moreover, in the above-described embodiment, the recording tape cartridge 10 is a so-called one-reel recording tape cartridge in which the single reel 14 is accommodated within the case 12. However, the present invention is not limited to the same. The recording tape cartridge 10 may be, for example, a so-called two-reel recording tape cartridge which accommodates two reels 14 which are for drawing-out and for taking-up. Accordingly, the present invention is not limited by the structures of the opening 20 and the door 50 and the like.

In the above-described embodiment, the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, the recording tape cartridge relating to the present invention has the excellent effect that it is possible to suppress the tilting, with respect to a case, of a braking member which impedes rotation of a reel when the recording tape cartridge is not in use.

What is claimed is:

1. A method of manufacturing a recording tape cartridge having a locking mechanism locking a reel which is accommodated in a case and on which a recording tape is wound, the method comprising the steps of:
   a. forming gear teeth at an inner side of a floor portion of a reel hub of the reel;
   b. forming an engaging projection at a surface of the case which surface opposes the floor portion of the reel hub;
   c. forming a braking member having a disc, and a braking gear, which is annular and which can mesh with the gear teeth, is provided at one surface of the disc, and a groove wall portion, which demarcates an insertion groove into which the engaging projection enters, stands erect at the disc, and the braking member can approach and move away from the floor portion of the reel hub within the case; and
   d. combining the braking member and the reel within the case; wherein
   the engaging projection includes projecting pieces which enter through-holes formed in the braking member when the braking member moves away from the floor portion of the reel hub within the case.

2. The method of manufacturing a recording tape cartridge of claim 1, wherein the engaging projection is formed in a polygonal shape.

3. The method of manufacturing a recording tape cartridge of claim 1, wherein the engaging member comprises a cross-shaped rib.

4. The method of manufacturing a recording tape cartridge of claim 3, wherein the insertion groove is substantially cross-shaped in a plan view.

5. The method of manufacturing a recording tape cartridge of claim 4, wherein engagement of the cross-shaped rib with the insertion groove impedes rotation of the braking member with respect to the case.

* * * * *